(12) United States Patent
Yamakawa

(10) Patent No.: US 7,035,018 B2
(45) Date of Patent: Apr. 25, 2006

(54) IMAGING LENS

(75) Inventor: Hiromitsu Yamakawa, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/790,882

(22) Filed: Mar. 3, 2004

(65) Prior Publication Data
US 2004/0179276 A1   Sep. 16, 2004

(30) Foreign Application Priority Data
Mar. 10, 2003   (JP)   ............... 2003-063786

(51) Int. Cl.
G02B 15/14   (2006.01)
(52) U.S. Cl. .................. 359/691; 359/717; 359/793
(58) Field of Classification Search ............. 359/691, 359/717, 793
See application file for complete search history.

(56) References Cited

U.S. PATENT DOCUMENTS

| 5,475,536 | A |   | 12/1995 | Kikutani |
| 5,502,597 | A |   | 3/1996  | Estelle et al. |
| 5,619,380 | A |   | 4/1997  | Ogasawara et al. |
| 5,812,327 | A |   | 9/1998  | Doh |
| 6,104,553 | A | * | 8/2000  | Nagahara ............. 359/793 |
| 6,147,816 | A |   | 11/2000 | Ori |
| 6,222,682 | B1 |  | 4/2001  | Saito et al. |
| 6,628,463 | B1 |  | 9/2003  | Koike |

FOREIGN PATENT DOCUMENTS

| JP | 02-071219 | 3/1990 |
|----|-----------|--------|
| JP | 02-077712 | 3/1990 |
| JP | 05-341185 | 12/1993 |
| JP | H6-67089  | 3/1994 |
| JP | 06-230275 | 8/1994 |
| JP | 07-043607 | 2/1995 |
| JP | 09-281388 | 10/1997 |
| JP | 10-078543 | 3/1998 |
| JP | 10-104511 | 4/1998 |
| JP | 10-115777 | 5/1998 |
| JP | H11-295592 | 10/1999 |
| JP | 11-337820 | 12/1999 |
| JP | 2000-035533 | 2/2000 |
| JP | 2000-162498 | 6/2000 |
| JP | 2000-321489 | 11/2000 |
| JP | 2000-347352 | 12/2000 |
| JP | 2001-504949 | 4/2001 |
| JP | 2001-174701 | 6/2001 |
| JP | 2001-183578 | 7/2001 |
| JP | 2003-140038 | 5/2003 |
| JP | 2003-149551 | 5/2003 |
| JP | 05-281465 | 10/2003 |
| JP | 2004-020996 | 1/2004 |

* cited by examiner

Primary Examiner—Scott J. Sugarman
Assistant Examiner—Darryl J. Collins
(74) Attorney, Agent, or Firm—Arnold International; Jon W. Henry; Bruce Y. Arnold

(57) ABSTRACT

An imaging lens for an image pickup device consists of two lens components that may each consist of a lens element. In order from the object side, these lens components have negative and positive refractive power, with each lens component having two aspheric surfaces. A stop is positioned between the lens components so as to be closer to the image-side lens component. Specified conditions are satisfied in order to miniaturize the imaging lens, reduce manufacturing and assembly costs, and improve imaging performance.

10 Claims, 13 Drawing Sheets

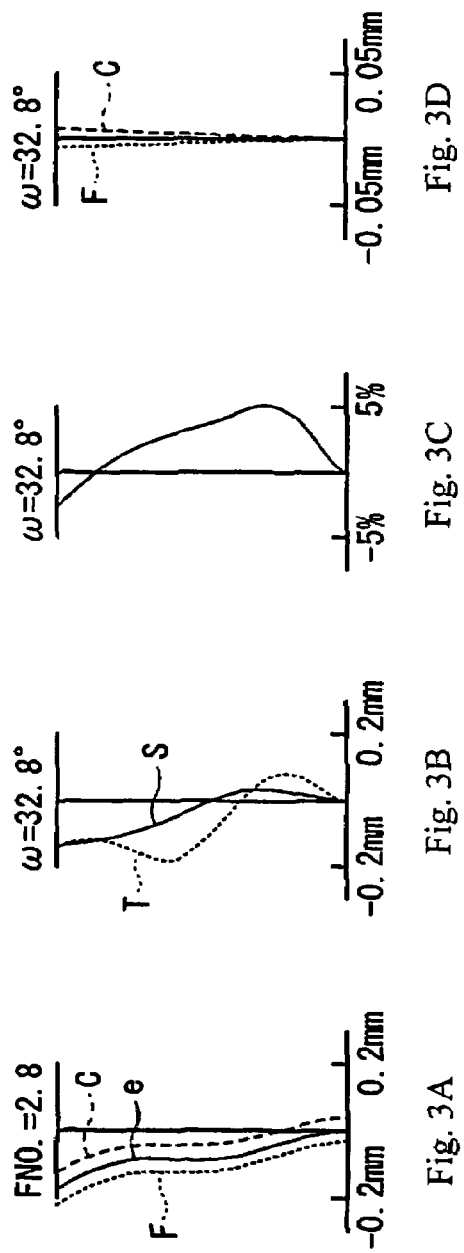
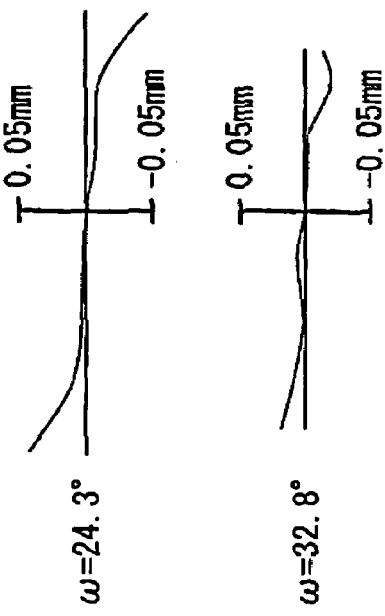

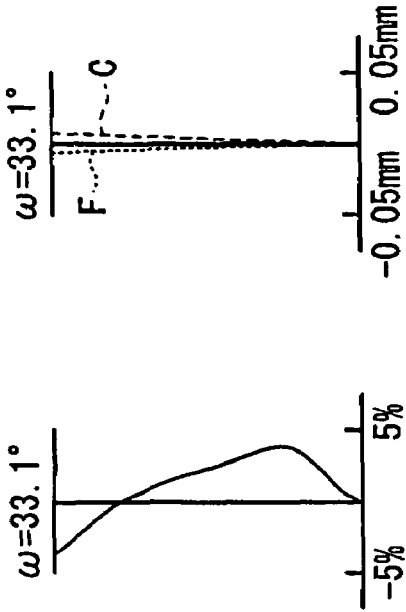
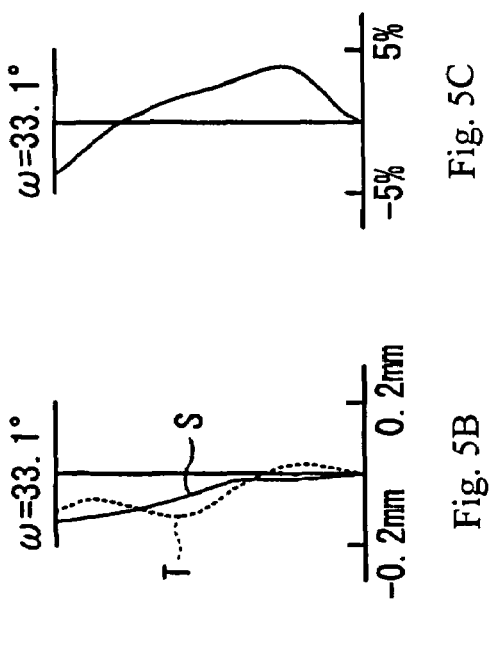
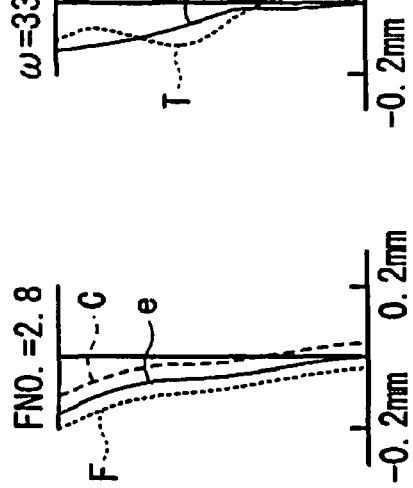
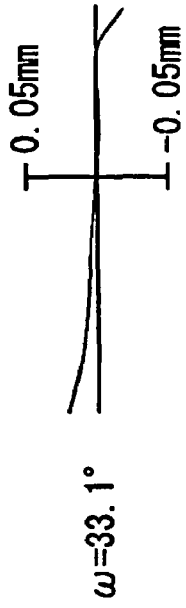
Fig. 5A  Fig. 5B  Fig. 5C  Fig. 5D
Fig. 6

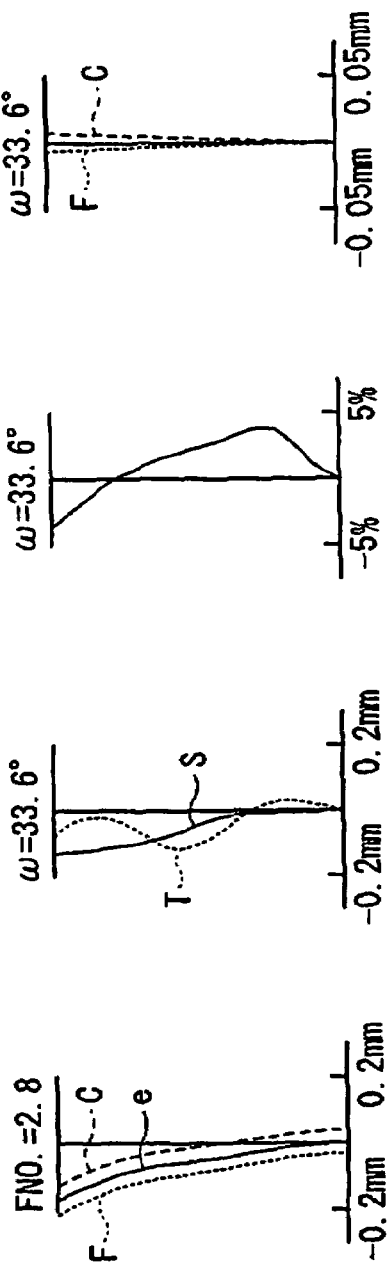
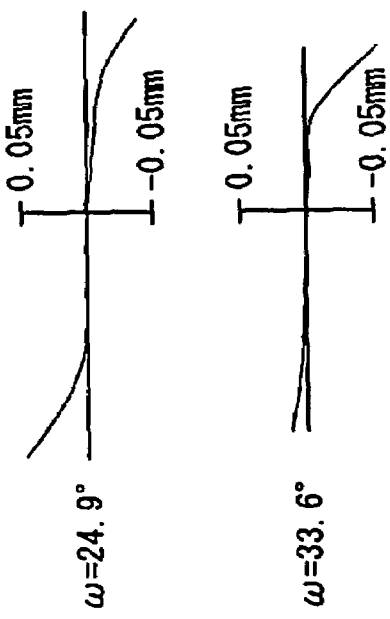

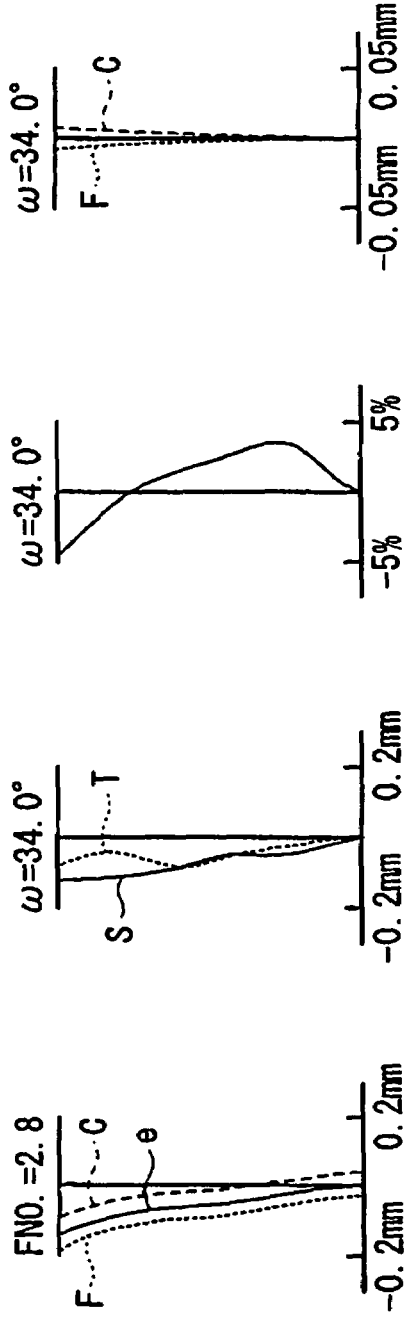
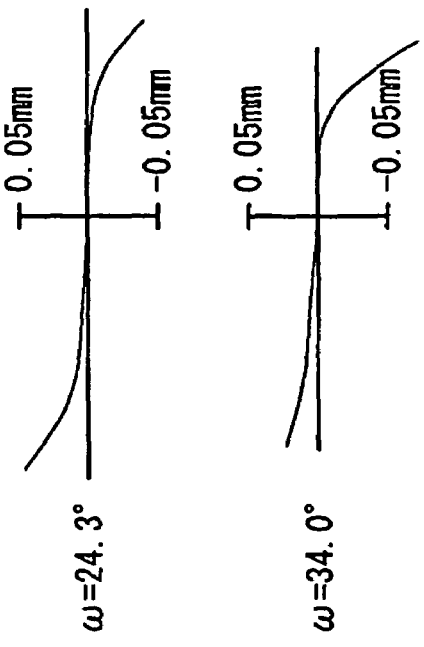

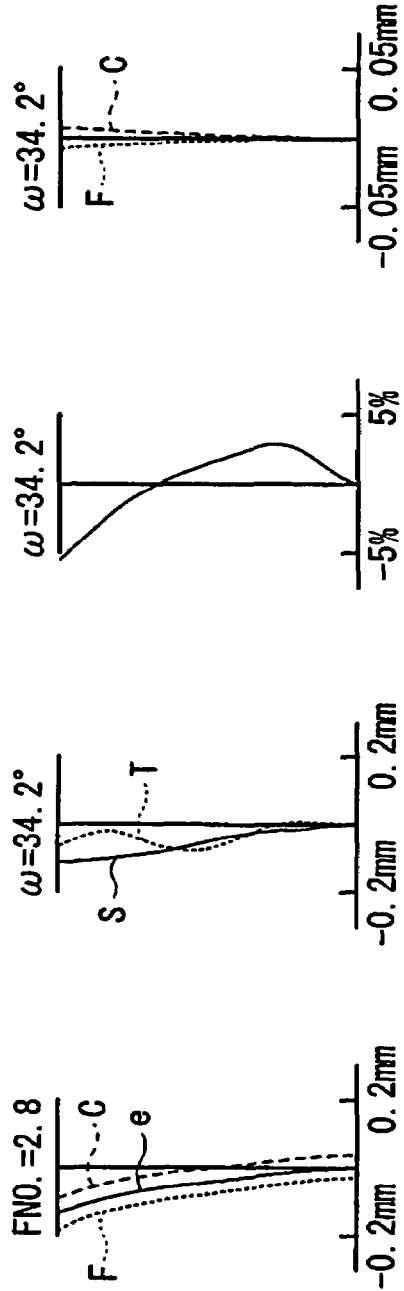
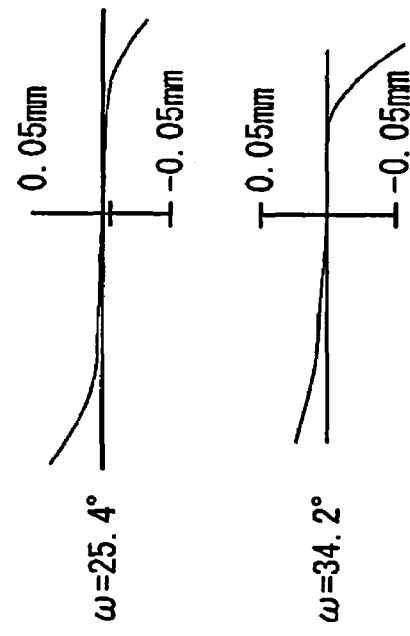

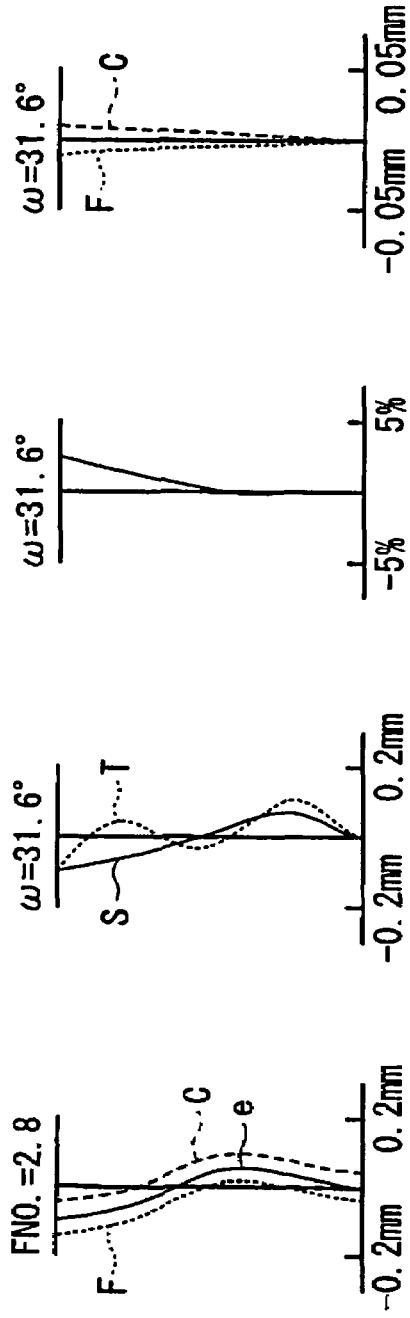
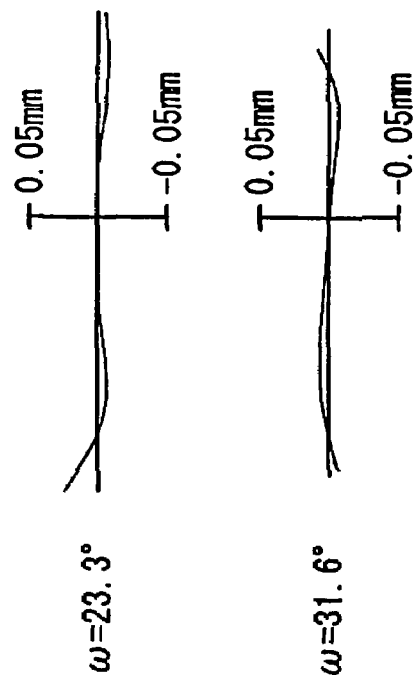

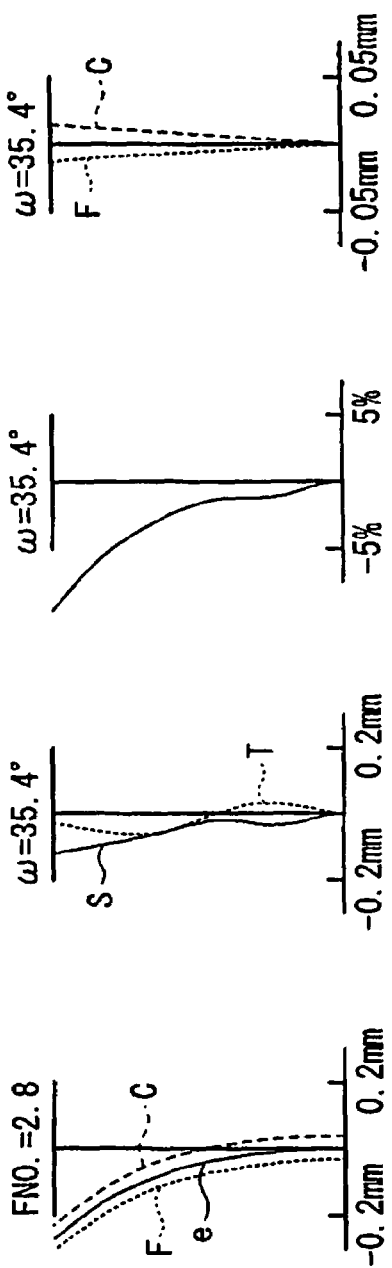
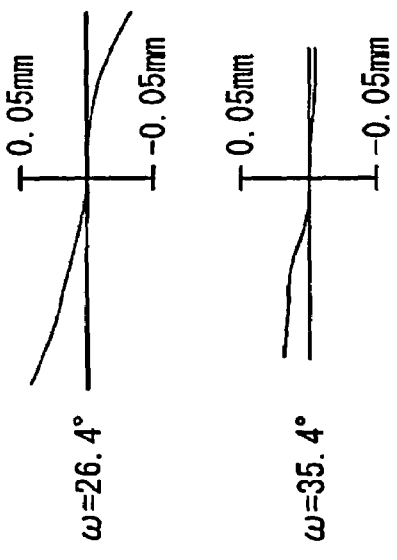

IMAGING LENS

BACKGROUND OF THE INVENTION

Recently, digital still cameras (hereinafter referred to simply as digital cameras) and portable terminal devices, such as portable telephones, that include a camera have become very popular. These cameras convert an image obtained through imaging optics to an electrical signal using an image pickup element, such as a CCD (charge-coupled device) or a CMOS (complementary metal-oxide-semiconductor), and record the signal as image data. In such cameras, a small wide-angle imaging lens is required. In particular, many two-component, two-element imaging lenses have been proposed based on their low cost and small size. For example, Japanese Laid-Open Patent Applications H06-067089, H11-295592, and 2001-183578 disclose such imaging lenses.

Japanese Laid-Open Patent Application H06-067089 disclose imaging lenses that include a first lens element made of plastic (i.e., synthetic resin) having negative refractive power and a meniscus shape with its convex lens surface on the object side, and a second lens element that is a biconvex lens component made of plastic with its object-side lens surface being spherical and having a large radius of curvature. These imaging lenses enable favorable correction of various aberrations while having the imaging lenses be short and compact.

Japanese Laid-Open Patent Application H11-295592 also discloses imaging lenses that include two lens elements. The first lens element is made of plastic, has negative refractive power, and has a meniscus shape with its convex lens surface on the object side. The second lens element is a biconvex lens component with nearly the same curvature on both lens surfaces.

Japanese Laid-Open Patent Application 2001-183578 also discloses an imaging lens that includes two lens elements with two or more aspheric lens surfaces, including an aspheric lens surface on each of the lens elements, and that satisfies specified conditions of lens parameters. This imaging lens is constructed with a small number of lens elements, is inexpensive, and is designed for use with a camera that uses a CCD or a CMOS as an image pickup element.

However, the imaging lenses of Japanese Laid-Open Patent Application H06-067089 have a half-field angle as small as 18.4° which thus does not provide a sufficient field angle (i.e. field of view). In the imaging lenses disclosed in Japanese Laid-Open Patent Application H11-295592, the ratio of the distance from the object side lens surface of the imaging lens to the image plane divided by the focal length of the imaging lens is in the range 3.8–4.5, and in Japanese Laid-Open Patent Application 2001-183578, the ratio of these distances is 2.45. The total length of the imaging lenses becomes relatively long in both cases, leaving much room for improvement in compactness of the imaging lenses.

BRIEF SUMMARY OF THE INVENTION

The present invention relates to an imaging lens for forming an image of an object on an image pickup element, and relates particularly to an imaging lens for providing an image in a portable terminal device, such as a portable telephone, or in a small digital camera, or a similar device, that is compact, has a large field angle, and that provides a bright image.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show the spherical aberration, astigmatism, distortion, and lateral color, respectively, of the imaging lens according to Embodiment 1;

FIG. 4 shows coma aberrations of the imaging lens according to Embodiment 1;

FIGS. 5A–5D show the spherical aberration, astigmatism, distortion, and lateral color, respectively, of the imaging lens according to Embodiment 2;

FIG. 6 shows coma aberrations of the imaging lens according to Embodiment 2;

FIGS. 7A–7D show the spherical aberration, astigmatism, distortion, and lateral color, respectively, of the imaging lens according to Embodiment 3;

FIG. 8 shows coma aberrations of the imaging lens according to Embodiment 3;

FIGS. 11A–11D show the spherical aberration, astigmatism, distortion, and lateral color, respectively, of the imaging lens according to Embodiment 5;

FIG. 12 shows coma aberrations of the imaging lens according to Embodiment 5;

FIGS. 13A–13D show the spherical aberration, astigmatism, distortion, and lateral color, respectively, of the imaging lens according to Embodiment 6;

FIG. 14 shows coma aberrations of the imaging lens according to Embodiment 6;

FIGS. 20A–20D show the spherical aberration, astigmatism, distortion, and lateral color, respectively, of the imaging lens according to Embodiment 9;

FIG. 21 shows coma aberrations of the imaging lens according to Embodiment 9;

FIGS. 22A–22D show the spherical aberration, astigmatism, distortion, and lateral color, respectively, of the imaging lens according to Embodiment 10; and FIG. 23 shows coma aberrations of the imaging lens according to Embodiment 10.

DETAILED DESCRIPTION

Figure 1:
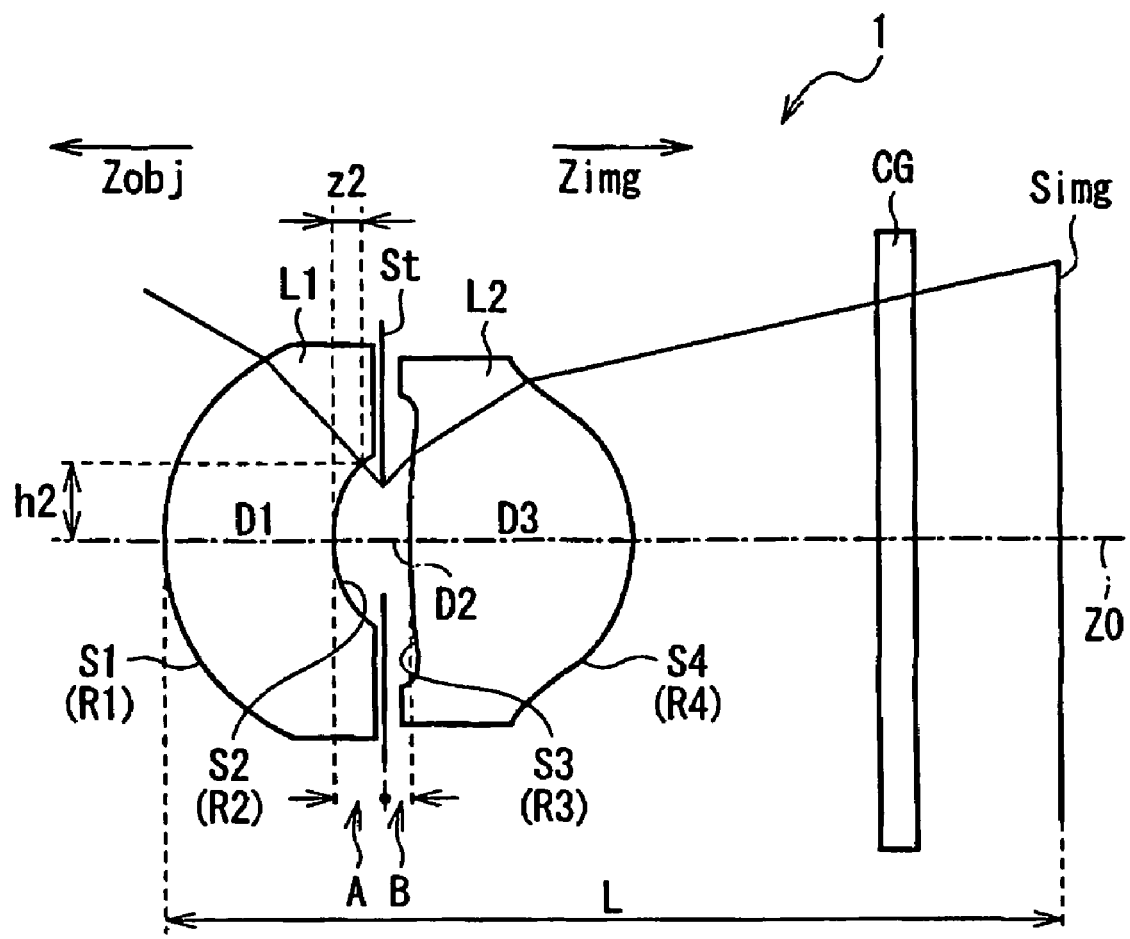
FIG. 1 shows a schematic cross-sectional view of the imaging lens according to Embodiment 1.
Figure 2:
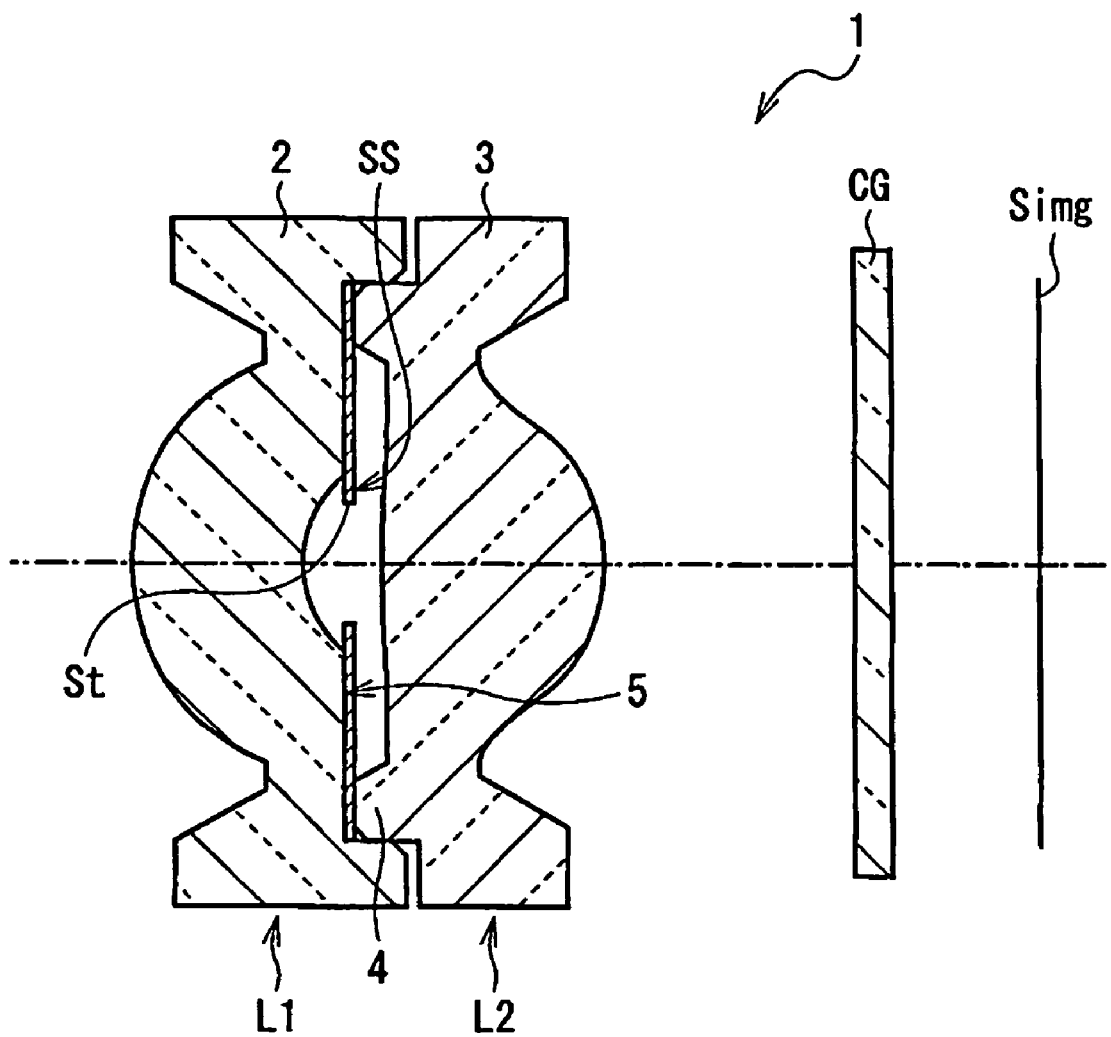
FIG. 2 shows a cross-sectional view of a specific construction of the imaging lens of FIG. 1.

A general description of the preferred embodiments of the imaging lens of the present invention will now be described with reference to FIGS. 1 and 2. FIG. 1 shows a schematic cross-sectional view of the imaging lens of Embodiment 1 of the present invention. FIG. 2 shows a cross-sectional view of a specific construction of the imaging lens of FIG. 1. In FIG. 1, the lens elements of the imaging lens 1 are referenced by the symbols L1 and L2, in order from the object side of the imaging lens. Similarly, the lens surfaces are referenced by the letter S followed by a number denoting their order from the object side of the imaging lens, from S1 to S4, and the radii of curvature of the lens elements are referenced by the letter R followed by a number denoting their order from the object side of the imaging lens, from R1 to R4, that parenthetically accompany the lens surface references. The on-axis surface spacings along the optical axis Z0 of the lens element surfaces are referenced by the letter D followed by a number denoting their order from the object side of the imaging lens, from D1 to D3. The image plane (image pickup plane) is referenced by the symbol Simg, and the distance from the object side lens surface S1 of the first lens element L1 to the image plane Simg is denoted by the symbol L.

Definitions of the terms "lens element" and "lens component" that relate to the following detailed description will now be given. The term "lens element" is herein defined as a single transparent mass of refractive material having two opposed refracting surfaces, which surfaces are positioned at least generally transversely of the optical axis of the imaging lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

As shown in FIG. 1, the imaging lens 1 is a two-component, two-element imaging lens that includes, arranged along the optical axis Z0 in order from the object side, a first lens element L1 and a second lens element L2. A stop St, such as a diaphragm that operates as an aperture stop, is arranged between the first lens element L1 and the second lens element L2.

The imaging lens 1 shown in FIG. 1 is suitable for use in a compact digital camera or in a video camera. In FIG. 1, a horizontal arrow above the symbol Zobj points in one direction in order to indicate the object side (subject side) of the imaging lens 1 and a horizontal arrow above the symbol Zimg points in the opposite direction in order to indicate the image plane side (image side) of the imaging lens 1.

The material of the first lens element L1 and the second lens element L2 may be either optical glass or plastic. An image pickup element (not shown in the drawings), such as a CCD, is arranged at the image plane Simg of the imaging lens 1, and a cover glass CG for protecting the image plane is arranged on the object side of and adjacent to the image plane Simg.

All four surfaces S1–S4 of the first and the second lens elements L1 and L2 are aspheric lens surfaces. The four aspheric lens surfaces are defined using the following equation:

$$Z=[(C \cdot Y^2)/\{1+(1-K \cdot C^2 \cdot Y^2)^{1/2}\}]+\Sigma(A_i \cdot Y^i) \qquad \text{Equation (A)}$$

where

Z is the length (in mm) of a line drawn from a point on the aspheric lens surface at a distance Y from the optical axis to the tangential plane of the aspheric surface vertex, C is the curvature (=1/R, the radius of curvature) of the aspheric lens surface on the optical axis, Y is the distance (in mm) from the optical axis, K is the eccentricity, and $A_i$ is the ith aspheric coefficient and the summation extends over i.

In embodiments of the invention disclosed below, only aspheric coefficients $A_3$–$A_{10}$ are non-zero.

The first lens element L1 has negative refractive power with its object-side surface S1 being convex and its image-side surface being concave, thereby defining a meniscus shape. Throughout the following descriptions of the imaging lens of the present invention, references to a lens surface being "convex" or "concave" refers to the shape of the lens surface near the optical axis. This is pointed out because sometimes an aspheric lens surface near the optical axis may have a different shape than the shape of a peripheral portion of the lens surface.

The second lens element L2 has positive refractive power with its image-side surface S4 being convex. The shape of the object-side surface S3 near the optical axis Z0 may be convex, concave or planar. In the example shown in FIG. 1, the shape of the lens surface S3 near the optical axis Z0 is convex so that the second lens element L2 has a biconvex shape.

The stop St is positioned along the optical axis Z0 nearer the second lens element L2 than the first lens element L1. In other words, the distance B along the optical axis Z0 between the vertex of lens surface S3 and the stop St is smaller than the distance A between the vertex of lens surface S2 and the stop St along the optical axis Z0. Considering the thickness of the stop St along the optical axis Z0, a part or the whole of the thickness of the stop St is closer to the second lens element L2 than the first lens element L1.

More specifically, in disclosed embodiments of the present invention that follow, the ratio B/A of the distance B between the vertex of lens surface S3 and the stop St divided by the distance A between the vertex of lens surface S2 and the stop St is about 0.4–0.7. However, the aberrations do not suddenly increase if the position of the stop St along the optical axis Z0 moves slightly out of this range, and thus the range of values of the ratio can be extended to between zero and 1.0.

The cover glass CG is a glass or plastic plane parallel plate for protection of an image pickup element (not shown in the drawings), but an IR blocking filter may be used to protect the image pickup element in lieu of using a cover glass. In the disclosed embodiments of the invention that follow, a 0.3 mm thick, plane parallel plate with a refractive index of 1.52 is used as a cover glass CG.

Preferably, as shown in FIG. 2, lens elements L1 and L2 form a unified structure for incorporation into a lens barrel (not shown). The term "unified structure" means that the lens elements L1 and L2 are fixed to one another so that they are not relatively movable during operation of the imaging lens. The unified structure of lens elements L1 and L2 may or may not be movable along the optical axis Z0 relative to the image plane Simg. When no movement of the unified structure along the optical axis Z0 relative to the image plane Simg is provided for, the imaging lens is defined as a fixed focus imaging lens.

In the example of FIG. 2, flanges 2 and 3, having an outer diameter corresponding to the inner diameter of a lens barrel, are provided around the optical surfaces (light transmission surfaces) of the first lens element L1 and the second lens element L2, respectively, for support by the inner wall of a lens barrel. An annular projection 4 extends between the object-side lens surface S3 and the flange 3 of the second lens element L2, and a planar step 5 orthogonal to the optical axis Z0 is provided between the image-side lens surface S2 and the flange 2 in the first lens element L1. The stop St is sandwiched between the planar step 5 of the first lens element L1 and the annular projection 4 of the second lens element L2. The lens spacing D2 is prescribed according to the position of planar step 5 in the direction of the optical axis Z0, the height of the annular projection 4 and the thickness of the stop St.

The imaging lens 1 has an f-number $F_{NO}$ of 4.0 or less, a half-field angle of 25° or more, a relatively wide field angle, and provides a relatively bright image.

Preferably, the imaging lens satisfies the following conditions:

$$0.15 < D2/D < 0.21 \quad \text{Condition (1)}$$

$$h2/z2 < 3.6 \quad \text{Condition (2)}$$

where
D is the distance along the optical axis from the object-side lens surface of the first lens component to the image-side lens surface of the second lens component,
D2 is the distance along the optical axis Z0 from the image-side lens surface S2 of the first lens element L1 to the object-side lens surface S3 of the second lens element L2,
h2 is the distance from the optical axis Z0 to the outermost optically effective portion of the second lens surface S2 of the first lens element L1, and
z2 is the distance along the optical axis Z0 from the vertex of the second lens surface S2 of the first lens element L1 to the point on the optical axis Z0 where h2 is determined.

In the imaging lens of FIG. 1, the distance D of the imaging lens equals the sum of D1, D2, and D3.

Satisfying Condition (1) helps miniaturize the imaging lens and helps provide a proper arrangement of the stop St. If the ratio of Condition (1) is smaller than the lower limit of Condition (1), the first lens element L1 and the second lens element L2 become so close together that positioning the stop St properly becomes difficult. On the other hand, if the ratio of Condition (1) is larger than the upper limit of Condition (1), the distance D of the imaging lens tends to be too large, in turn tending to make the distance from the first lens surface S1 to the image plane Simg too large, which also tends to increase the cost of the imaging lens.

Satisfying Condition (2) helps improve the imaging performance of the imaging lens. If the ratio of Condition (2) is larger than the upper limit of Condition (2), coma increases. If this aspect of imaging performance is particularly emphasized, it is preferable for the ratio of Condition (2) to be even smaller than the upper limit, for example, smaller than 2.6. In addition, if the second lens surface S2 is considered to be a spherical lens surface, and z2<h2, then a lower limit of 1.0 is introduced as a lower limit for the ratio of Condition (2).

Preferably, along with satisfying Conditions (1) and (2) above, the imaging lens also satisfies the following condition:

$$0 \leq |f/R3| \leq 0.7 \quad \text{Condition (3)}$$

where
f is the focal length of the entire imaging lens 1, and
R3 is the radius of curvature on the optical axis Z0 of the object-side lens surface S3 of the second lens element L2.

Satisfying Condition (3) helps improve problems of imaging performance associated with manufacturing errors of the imaging lens. If the ratio of Condition (3) is larger than the upper limit of Condition (3), the radius of curvature R3 becomes too small, making the refractive power of the lens surface S3 too large. The larger the refractive power of lens surface S3, the more any misalignment of lens surfaces S3 and S4 deteriorates the image produced by the imaging lens. Therefore, if the radius of curvature R3 is too small, it becomes difficult to manufacture the second lens elements L2 reliably and cheaply with a high yield without misalignment of the lens surfaces S3 and S4 that excessively deteriorates the image produced by the imaging lens.

Moreover, it is preferable that the imaging lens 1 satisfies, along with Conditions (1) and (2) above, one of the following conditions:

$$v_{d1} = v_{d2} \quad \text{Condition (4)}$$

$$v_{d1} < v_{d2} \quad \text{Condition (5)}$$

where
$v_{d1}$ is the Abbe number at the d-line (λ=587.6 nm) of the lens material of the first lens element L1, and
$v_{d2}$ is the Abbe number at the d-line (λ=587.6 nm) of the lens material of the second lens element L2.

More particularly, the Abbe number $v_d$ of each lens material is specifically defined as follows:

$$v_d = (N_d - 1)/(N_F - N_C)$$

where
$N_d$ is the refractive index at the d-line (λ=587.6 nm) of the lens material of the lens element,
$N_F$ is the refractive index at the F-line (λ=486.1 nm) of the lens material of the lens element, and
$N_C$ is the refractive index at the C-line (λ=656.3 nm) of the lens material of the lens element.

Satisfying Condition (4) or Condition (5) helps improve problems of image performance associated with manufacturing errors of the imaging lens. Satisfying Condition (5) effectively reduces chromatic aberrations and improves imaging performance. On the other hand, when chromatic aberrations are not a major problem, satisfying Condition (4) provides adequate imaging performance. Satisfying Condition (4) allows using the same material for lens elements L1 and L2, which simplifies manufacture of the imaging lens.

Furthermore, it is preferable, when satisfying Conditions (1), (2), and (5) above, that the following condition be satisfied:

$$0 \leq |f/R3| \leq 0.6 \quad \text{Condition (6)}$$

where f and R3 are as defined above.

Condition (6) prescribes the range of Condition (3) above even more narrowly. By having the ratio of Condition (6) satisfy the lower limit of Condition (6), coma is easily controlled, and a suitable f-number $F_{NO}$ is easily obtained. By having the ratio of Condition (6) satisfy the upper limit of Condition (6), manufacturing the imaging lens with good imaging performance is assisted because the refractive power of the third lens surface S3 is not so large that it increases problems of manufacturing the imaging lens.

Furthermore, preferably, along with satisfying Conditions (1), (2), and (3) above, the following conditions are satisfied:

$$0.6 \leq f2/f \leq 0.8 \quad \text{Condition (7)}$$

$$0.15 \leq (f2)^2/f \cdot f1 \leq 0.32 \quad \text{Condition (8)}$$

where
- f1 is the focal length of the first lens element L1,
- f2 is the focal length of the second lens element L2, and
- f is as defined above.

The miniaturization and the enhancement of image quality can be realized by properly setting the ratios of Conditions (7) and (8). If the ratio of Condition (7) or Condition (8) is larger than the upper limit of Condition (7) or Condition (8), respectively, the distance from the first lens surface S1 of the first lens element L1 to the image plane Simg becomes larger, making the entire imaging lens 1 longer. On the other hand, if the ratio of Condition (7) or Condition (8) is smaller than the lower limit of Condition (7) or Condition (8), respectively, it is hard to favorably correct the coma.

As shown in FIG. 1, a peripheral ray of an object beam from an object (not shown in FIG. 1) sequentially passes through the first lens element L1, the stop St that serves as an aperture stop, the second lens element L2 and the cover glass CG, and then forms an image of the object on the image plane Simg. The stop St prescribes the distance h2 from the optical axis Z0 to the outermost optically effective portion of the second lens surface S2 and is closer to the second lens element L2 than to the first lens element L1, thereby improving the image performance of the imaging lens 1 as follows. Namely, if the distance from the second lens surface S2 to the stop St is reduced, the radius of curvature R2 of the second lens surface S2 tends to decrease in order to keep aberrations generally low, which increases the difficulty of manufacturing the imaging lens. If the distance from the stop St to the third surface S3 is increased, the thickness of the periphery of the second lens element L2 in the direction of the optical axis is decreased in order to increase the effective radius of the light beam passing through the second lens element L2, which increases the difficulty of manufacturing the imaging lens. If the thickness of the second lens element L2 is increased in order to maintain the thickness of the periphery of the second lens element L2 in the direction of optical axis, aberrations, such as astigmatism, increase. Optimally, the aperture stop, defined by the stop St, is located at a position along the optical axis Z0 that is closer to the second lens element L2 than to the first lens element L1.

The imaging lens of the present invention enables a short total length of the imaging lens, which allows for miniaturization of the imaging lens, while it reduces aberrations, provides a bright image and a large field angle by using a minimum number of lens components and lens elements, namely two lens components and two lens elements, using aspheric lens surfaces for the lens components and lens elements, and variously satisfying Conditions (1)–(8) above. Accordingly, the imaging lens of the present invention is particularly suitable for providing an image in a portable terminal device, such as a portable telephone, or in a small digital camera.

Embodiments 1–10 of the present invention will now be individually described with further reference to the drawings. In the following descriptions, references will be frequently made to a "lens element." However, as set forth above, it is understood that lens elements described below are also lens components and may be replaced by lens components that include more than one lens element.

Embodiment 1

FIG. 1 shows Embodiment 1 of the present invention. Table 1 below lists the surface number #, in order from the object side, the radius of curvature R (in mm) of each surface near the optical axis, the on-axis surface spacing D (in mm), as well as the refractive index $N_e$ (at the e-line of $\lambda$=546.1 nm) and the Abbe number $\nu_d$ (at the d-line of $\lambda$=587.6 nm) of each lens element for Embodiment 1. Listed in the bottom portion of Table 1 are the values of f, f1, f2, D, h2, and z2 (all in mm), which have been defined with respect to Conditions (1)–(3) and (6)–(8) above, for Embodiment 1. Also listed in the bottom of Table 1 are the distance L (in mm) along the optical axis Z0 from the first lens surface S1 of the first lens element L1 to the image plane Simg for an in-focus image of an object at infinity for Embodiment 1, the distances A and B (both in mm) defined above in relation to the position of the stop St and the vertices of lens surfaces S2 and S3, and the ratio B/A.

TABLE 1

| # | R | D | $N_e$ | $\nu_d$ |
|---|---|---|---|---|
| 1 | 1.826 | 1.350 | 1.58820 | 30.3 |
| 2 | 0.905 | 0.640 | | |
| 3 | ∞ | 1.820 | 1.51081 | 56.0 |
| 4 | −1.189 | | | |
| f = 3.560 | f1 = −6.678 | f2 = 2.328 | D = 3.810 | h2 = 0.622 |
| z2 = 0.260 | L = 7.380 | A = 0.400 | B = 0.240 | B/A = 0.600 |

Table 2 below lists the values of the constants K and $A_3$–$A_{10}$ used in Equation (A) above for each of the lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$. The values recited are those obtained by rounding off the fourth decimal place.

TABLE 2

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −2.8304 | 5.1141E−2 | −4.6602E−2 | 1.0395E−1 | 2.5686E−2 | −7.0754E−2 | −2.2701E−2 | 5.8308E−2 | −1.8145E−2 |
| 2 | 2.9805E−1 | −2.9840E−2 | 1.0717E−1 | 2.3612E−1 | 1.5508E−1 | −9.1903E−3 | −2.0684E−2 | −1.1611E−1 | −1.0287E−2 |
| 3 | 1.0000 | 7.6045E−2 | −1.8015E−1 | 8.6859E−2 | −3.7293E−4 | 2.1642E−1 | 3.9442E−2 | −2.0113E−1 | −4.4642E−2 |
| 4 | −1.9276E−1 | 6.6141E−2 | −1.1463E−1 | −1.8584E−2 | −1.3183E−2 | 9.2156E−2 | 4.7593E−3 | −1.1001E−1 | 5.1449E−2 |

The imaging lens of Embodiment 1 satisfies Conditions (1)–(3) and (5)–(8) as will be set out later in Table 21.

FIGS. 3A–3D show the spherical aberration, astigmatism, distortion, and lateral color, respectively, of the imaging lens according to Embodiment 1. In FIG. 3A, the spherical aberration is shown for the e-line ($\lambda$=546.1 nm), the F-line ($\lambda$=486.1 nm), and the C-line ($\lambda$=656.3 nm). As shown in FIG. 3A, the f-number, denoted as FNO, of this embodiment is 2.8. As shown in FIGS. 3B–3D, the half-field angle $\omega$ of this embodiment is 32.8°. In FIG. 3B, the astigmatism is shown at the e-line ($\lambda$=546.1 nm) for both the sagittal image surface S and the tangential image surface T. In FIG. 3C, the distortion is shown at the e-line ($\lambda$=546.1 nm). FIG. 3D shows the lateral color at the F-line ($\lambda$=486.1 nm), and the C-line ($\lambda$=656.3 nm) relative to the e-line ($\lambda$=546.1 nm). The coma aberrations of this embodiment at half-field angles $\omega$ of 24.3° and 32.8° at the e-line ($\lambda$=546.1 nm) are shown at the top and bottom, respectively, of FIG. 4.

As is clear from the lens data and aberration curves discussed above, in Embodiment 1 the various aberrations are favorably corrected, and performance capabilities that are suitable for an imaging lens are obtained.

Embodiment 2

Embodiment 2 is very similar to Embodiment 1 and is well shown by FIG. 1. Table 3 below lists the surface number #, in order from the object side, the radius of curvature R (in mm) of each surface near the optical axis, the on-axis surface spacing D (in mm), as well as the refractive index $N_e$ (at the e-line of $\lambda$=546.1 nm) and the Abbe number $\nu_d$ (at the d-line of $\lambda$=587.6 nm) of each lens element for Embodiment 2. Listed in the bottom portion of Table 3 are the values of f, f1, f2, D, h2, and z2 (all in mm), which have been defined with respect to Conditions (1)–(3) and (6)–(8) above, for Embodiment 2. Also listed in the bottom of Table 3 are the distance L (in mm) along the optical axis Z0 from the first lens surface S1 of the first lens element L1 to the image plane Simg for an in-focus image of an object at infinity for Embodiment 2, the distances A and B (both in mm) defined above in relation to the position of the stop St and the vertices of lens surfaces S2 and S3, and the ratio B/A.

TABLE 3

| # | R | D | $N_e$ | $\nu_d$ |
|---|---|---|---|---|
| 1 | 1.826 | 1.367 | 1.58820 | 30.3 |
| 2 | 0.905 | 0.642 | | |
| 3 | 22.530 | 1.800 | 1.51081 | 56.0 |
| 4 | −1.215 | | | |
| f = 3.582 | f1 = −6.785 | f2 = 2.318 | D = 3.821 | h2 = 0.611 |
| z2 = 0.248 | L = 7.286 | A = 0.400 | B = 0.242 | B/A = 0.605 |

Table 4 below lists the values of the constants K and $A_3$–$A_{10}$ used in Equation (A) above for each of the lens surfaces of Table 3. Aspheric coefficients that are not present in Table 4 are zero. An "E" in the data indicates that the number following the "E" is the exponent to the base 10. For example, "1.0E-2" represents the number $1.0 \times 10^{-2}$. The values recited are those obtained by rounding off the fourth decimal place.

TABLE 4

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −2.8304 | 5.1141E−2 | −4.6602E−2 | 1.0395E−1 | 2.5686E−2 | −7.0754E−2 | −2.2701E−2 | 5.8308E−2 | −1.8145E−2 |
| 2 | 2.9805E−1 | −2.9840E−2 | 1.0717E−1 | 2.3612E−1 | 1.5508E−1 | −9.1903E−3 | −2.0684E−2 | −1.1611E−1 | −1.0287E−2 |
| 3 | 5.3755E−1 | −1.3355E−2 | 2.3954E−2 | −3.8866E−2 | −2.8069E−2 | 1.7905E−1 | 4.7451E−2 | −1.1176E−1 | −3.8368E−2 |
| 4 | −4.6025E−1 | 4.3872E−2 | −1.0987E−1 | −2.3690E−2 | −9.5266E−3 | 9.5936E−2 | 6.8305E−4 | −1.1766E−1 | 5.8342E−2 |

The imaging lens of Embodiment 2 satisfies Conditions (1)–(3) and (5)–(8) as will be set out later in Table 21.

FIGS. 5A–5D show the spherical aberration, astigmatism, distortion, and lateral color, respectively, of the imaging lens according to Embodiment 2. In FIG. 5A, the spherical aberration is shown for the e-line ($\lambda$=546.1 nm), the F-line ($\lambda$=486.1 nm), and the C-line ($\lambda$=656.3 nm). As shown in FIG. 5A, the f-number, denoted as FNO, of this embodiment is 2.8. As shown in FIGS. 5B–5D, the half-field angle $\omega$ of this embodiment is 33.1°. In FIG. 5B, the astigmatism is shown at the e-line ($\lambda$=546.1 nm) for both the sagittal image surface S and the tangential image surface T. In FIG. 5C, the distortion is shown at the e-line ($\lambda$=546.1 nm). FIG. 5D shows the lateral color at the F-line ($\lambda$=486.1 nm), and the C-line ($\lambda$=656.3 nm) relative to the e-line ($\lambda$=546.1 nm). The coma aberrations of this embodiment at half-field angles $\omega$ of 24.5° and 33.1° at the e-line ($\lambda$=546.1 nm) are shown at the top and bottom, respectively, of FIG. 6.

As is clear from the lens data and aberration curves discussed above, in Embodiment 2 the various aberrations are favorably corrected, and performance capabilities that are suitable for an imaging lens are obtained.

Embodiment 3

Embodiment 3 is very similar to Embodiment 1 and is well shown by FIG. 1. Table 5 2below lists the surface number #, in order from the object side, the radius of curvature R (in mm) of each surface near the optical axis, the on-axis surface spacing D (in mm), as well as the refractive index $N_e$ (at the e-line of $\lambda$=546.1 nm) and the Abbe number $\nu_d$ (at the d-line of $\lambda$=587.6 nm) of each lens element for Embodiment 3. Listed in the bottom portion of Table 5 are the values of f1, f2, D, h2, and z2 (all in mm), which have been defined with respect to Conditions (1)–(3) and (6)–(8) above, for Embodiment 3. Also listed in the bottom of Table 5 are the distance L (in mm) along the optical axis Z0 from the first lens surface S1 of the first lens element L1 to the image plane Simg for an in-focus image of an object at infinity for Embodiment 3, the distances A and B (both in mm) defined above in relation to the position of the stop St and the vertices of lens surfaces S2 and S3, and the ratio B/A.

TABLE 5

| # | R | D | $N_e$ | $\nu_d$ |
|---|---|---|---|---|
| 1 | 1.907 | 1.446 | 1.58820 | 30.3 |
| 2 | 0.916 | 0.640 | | |

TABLE 5-continued

| # | R | D | $N_e$ | $\nu_d$ |
|---|---|---|---|---|
| 3 | 15.440 | 1.800 | 1.51081 | 56.0 |
| 4 | −1.202 | | | |
| f = 3.511 | f1 = −6.541 | f2 = 2.268 | D = 3.879 | h2 = 0.607 |
| z2 = 0.243 | L = 7.282 | A = 0.400 | B = 0.240 | B/A = 0.600 |

Table 6 below lists the values of the constants K and $A_3$–$A_{10}$ used in Equation (A) above for each of the lens surfaces of Table 5. Aspheric coefficients that are not present in Table 6 are zero. An "E" in the data indicates that the number following the "E" is the exponent to the base 10. For example, "1.0E-2" represents the number $1.0\times10^{-2}$. The values recited are those obtained by rounding off the fourth decimal place.

TABLE 6

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −2.4806 | 4.4652E−2 | −4.2233E−2 | 8.9150E−2 | 2.4300E−2 | −5.8971E−2 | −2.1577E−2 | 4.8960E−2 | −1.4784E−2 |
| 2 | 3.3307E−1 | −1.6930E−2 | 1.0489E−1 | 2.1199E−1 | 1.5427E−1 | −3.1592E−3 | −1.9482E−2 | −1.0399E−1 | −9.3179E−3 |
| 3 | 5.3279E−1 | −6.5629E−3 | 2.1026E−2 | −3.8065E−2 | −2.7992E−2 | 1.7587E−1 | 4.7165E−2 | −1.1334E−1 | −3.8551E−2 |
| 4 | −5.7548E−1 | 3.9246E−2 | −1.0912E−1 | −3.0394E−2 | −9.5139E−3 | 1.0001E−1 | 1.0582E−3 | −1.1699E−1 | 5.7569E−2 |

The imaging lens of Embodiment 3 satisfies Conditions (1)–(3) and (5)–(8) as will be set out later in Table 21.

FIGS. 7A–7D show the spherical aberration, astigmatism, distortion, and lateral color, respectively, of the imaging lens according to Embodiment 3. In FIG. 7A, the spherical aberration is shown for the e-line ($\lambda$=546.1 nm), the F-line ($\lambda$=486.1 nm), and the C-line ($\lambda$=656.3 nm). As shown in FIG. 7A, the f-number, denoted as FNO, of this embodiment is 2.8. As shown in FIGS. 7B–7D, the half-field angle $\omega$ of this embodiment is 33.6°. In FIG. 7B, the astigmatism is shown at the e-line ($\lambda$=546.1 nm) for both the sagittal image surface S and the tangential image surface T. In FIG. 7C, the distortion is shown at the e-line ($\lambda$=546.1 nm). FIG. 7D shows the lateral color at the F-line ($\lambda$=486.1 nm), and the C-line ($\lambda$=656.3 nm) relative to the e-line ($\lambda$=546.1 nm). The coma aberrations of this embodiment at half-field angles $\omega$ of 24.9° and 33.6° at the e-line ($\lambda$=546.1 nm) are shown at the top and bottom, respectively, of FIG. 8.

As is clear from the lens data and aberration curves discussed above, in Embodiment 3 the various aberrations are favorably corrected, and performance capabilities that are suitable for an imaging lens are obtained.

Embodiment 4

Embodiment 4 is very similar to Embodiment 1 and is well shown by FIG. 1. Table 7 below lists the surface number #, in order from the object side, the radius of curvature R (in mm) of each surface near the optical axis, the on-axis surface spacing D (in mm), as well as the refractive index $N_e$ (at the e-line of $\lambda$=546.1 nm) and the Abbe number $\nu_d$ (at the d-line of $\lambda$=587.6 nm) of each lens element for Embodiment 4. Listed in the bottom portion of Table 7 are the values of f, f1, f2, D, h2, and z2 (all in mm), which have been defined with respect to Conditions (1)–(3) and (6)–(8) above, for Embodiment 4. Also listed in the bottom of Table 7 are the distance L (in mm) along the optical axis Z0 from the first lens surface S1 of the first lens element L1 to the image plane Simg for an in-focus image of an object at infinity for Embodiment 4, the distances A and B (both in mm) defined above in relation to the position of the stop St and the vertices of lens surfaces S2 and S3, and the ratio B/A.

TABLE 7

| # | R | D | $N_e$ | $\nu_d$ |
|---|---|---|---|---|
| 1 | 1.828 | 1.463 | 1.58820 | 30.3 |
| 2 | 0.913 | 0.640 | | |
| 3 | 20.594 | 1.804 | 1.51081 | 56.0 |
| 4 | −1.197 | | | |
| f = 3.557 | f1 = −7.612 | f2 = 2.280 | D = 3.902 | h2 = 0.607 |
| z2 = 0.246 | L = 7.185 | A = 0.400 | B = 0.240 | B/A = 0.600 |

Table 8 below lists the values of the constants K and $A_3$–$A_{10}$ used in Equation (A) above for each of the lens surfaces of Table 7. Aspheric coefficients that are not present in Table 8 are zero. An "E" in the data indicates that the number following the "E" is the exponent to the base 10. For example, "1.0E-2" represents the number $1.0\times10^{-2}$. The values recited are those obtained by rounding off the fourth decimal place.

TABLE 8

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −2.1206 | 4.7658E−2 | −3.6093E−2 | 8.2307E−2 | 2.2500E−2 | −5.4090E−2 | −2.0351E−2 | 4.6071E−2 | −1.3528E−2 |
| 2 | 4.4299E−1 | −1.5844E−2 | 1.0349E−1 | 1.9962E−1 | 1.5382E−1 | −7.8110E−4 | −1.8925E−2 | −9.8146E−2 | −8.8412E−3 |
| 3 | 5.3708E−1 | −5.6830E−3 | 1.5128E−2 | −4.5319E−2 | −2.6563E−2 | 1.8788E−1 | 4.7467E−2 | −1.1904E−1 | −3.9775E−2 |
| 4 | −5.6434E−1 | 4.2729E−2 | −1.0897E−1 | −3.0891E−2 | −9.4932E−3 | 9.8223E−2 | 9.2038E−4 | −1.1675E−1 | 5.7088E−2 |

The imaging lens of Embodiment 4 satisfies Conditions (1)–(3) and (5)–(8) as will be set out later in Table 21.

Figures 9A, 9B, 9C, 9D:
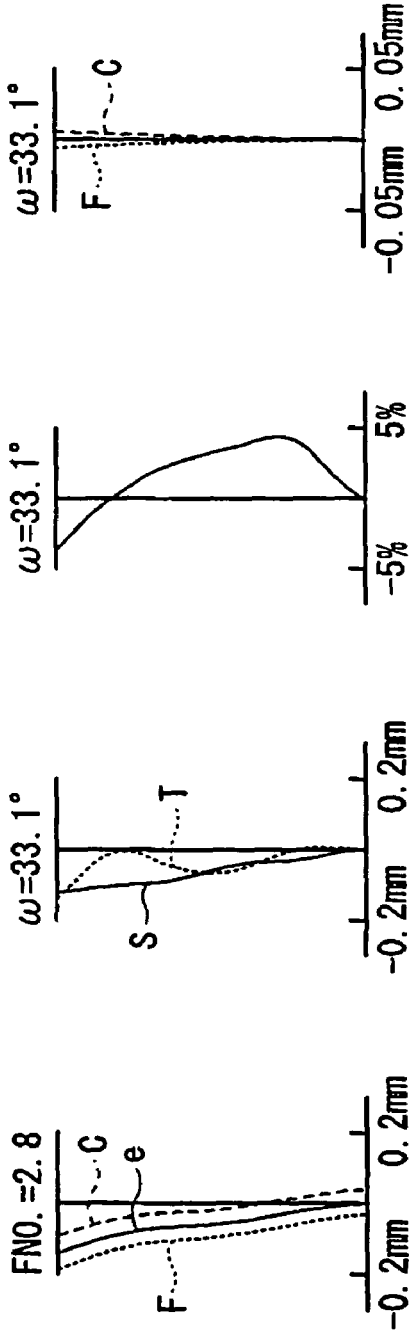
FIGS. 9A–9D show the spherical aberration, astigmatism, distortion, and lateral color, respectively, of the imaging lens according to Embodiment 4.
Figure 10:
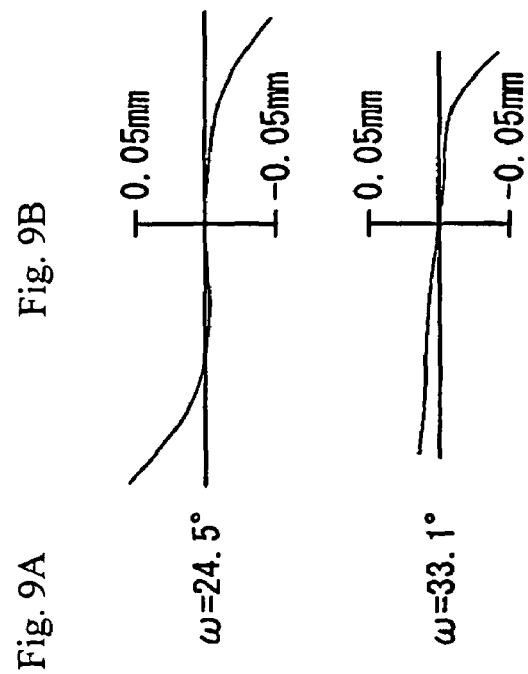
FIG. 10 shows coma aberrations of the imaging lens according to Embodiment 4.

FIGS. 9A–9D show the spherical aberration, astigmatism, distortion, and lateral color, respectively, of the imaging lens according to Embodiment 4. In FIG. 9A, the spherical aberration is shown for the e-line ($\lambda$=546.1 nm), the F-line ($\lambda$=486.1 nm), and the C-line ($\lambda$=656.3 nm). As shown in FIG. 9A, the f-number, denoted as FNO, of this embodiment is 2.8. As shown in FIGS. 9B–9D, the half-field angle $\omega$ of this embodiment is 33.1°. In FIG. 9B, the astigmatism is shown at the e-line ($\lambda$=546.1 nm) for both the sagittal image surface S and the tangential image surface T. In FIG. 9C, the distortion is shown at the e-line ($\lambda$=546.1 nm). FIG. 9D shows the lateral color at the F-line ($\lambda$=486.1 nm), and the C-line ($\lambda$=656.3 nm) relative to the e-line ($\lambda$=546.1 nm). The coma aberrations of this embodiment at half-field angles $\omega$ of 24.5° and 33.1° at the e-line ($\lambda$=546.1 nm) are shown at the top and bottom, respectively, of FIG. 10.

As is clear from the lens data and aberration curves discussed above, in Embodiment 4 the various aberrations are favorably corrected, and performance capabilities that are suitable for an imaging lens are obtained.

Embodiment 5

Embodiment 5 is very similar to Embodiment 1 and is well shown by FIG. 1. Table 9 below lists the surface number #, in order from the object side, the radius of curvature R (in mm) of each surface near the optical axis, the on-axis surface spacing D (in mm), as well as the refractive index $N_e$ (at the e-line of $\lambda$=546.1 nm) and the Abbe number $v_d$ (at the d-line of $\lambda$=587.6 nm) of each lens element for Embodiment 5. Listed in the bottom portion of Table 9 are the values of f, f1, f2, D, h2, and z2 (all in mm), which have been defined with respect to Conditions (1)–(3) and (6)–(8) above, for Embodiment 5. Also listed in the bottom of Table 9 are the distance L (in mm) along the optical axis Z0 from the first lens surface S1 of the first lens element L1 to the image plane Simg for an in-focus image of an object at infinity for Embodiment 5, the distances A and B (both in mm) defined above in relation to the position of the stop St and the vertices of lens surfaces S2 and S3, and the ratio B/A.

TABLE 9

| # | R | D | $N_e$ | $v_d$ |
|---|---|---|---|---|
| 1 | 1.863 | 1.424 | 1.58820 | 30.3 |
| 2 | 0.878 | 0.640 | | |
| 3 | 14.865 | 1.800 | 1.51081 | 56.0 |
| 4 | −1.191 | | | |
| f = 3.496 | f1 = −6.080 | f2 = 2.244 | D = 3.855 | h2 = 0.600 |
| z2 = 0.249 | L = 7.307 | A = 0.400 | B = 0.240 | B/A = 0.600 |

Table 10 below lists the values of the constants K and $A_3$–$A_{10}$ used in Equation (A) above for each of the lens surfaces of Table 9. Aspheric coefficients that are not present in Table 10 are zero. An "E" in the data indicates that the number following the "E" is the exponent to the base 10. For example, "1.0E-2" represents the number $1.0 \times 10^{-2}$. The values recited are those obtained by rounding off the fourth decimal place.

The imaging lens of Embodiment 5 satisfies Conditions (1)–(3) and (5)–(8) as will be set out later in Table 21.

FIGS. 11A–11D show the spherical aberration, astigmatism, distortion, and lateral color, respectively, of the imaging lens according to Embodiment 5. In FIG. 11A, the spherical aberration is shown for the e-line ($\lambda$=546.1 nm), the F-line ($\lambda$=486.1 nm), and the C-line ($\lambda$=656.3 nm). As shown in FIG. 11A, the f-number, denoted as FNO, of this embodiment is 2.8. As shown in FIGS. 11B–11D, the half-field angle $\omega$ of this embodiment is 34.0°. In FIG. 11B, the astigmatism is shown at the e-line ($\lambda$=546.1 nm) for both the sagittal image surface S and the tangential image surface T. In FIG. 11C, the distortion is shown at the e-line ($\lambda$=546.1 nm). FIG. 11D shows the lateral color at the F-line ($\lambda$=486.1 nm), and the C-line ($\lambda$=656.3 nm) relative to the e-line ($\lambda$=546.1 nm). The coma aberrations of this embodiment at half-field angles $\omega$ of 24.3° and 34.0° at the e-line ($\lambda$=546.1 nm) are shown at the top and bottom, respectively, of FIG. 12.

As is clear from the lens data and aberration curves discussed above, in Embodiment 5 the various aberrations are favorably corrected, and performance capabilities that are suitable for an imaging lens are obtained.

Embodiment 6

Embodiment 6 is very similar to Embodiment 1 and is well shown by FIG. 1. Table 11 below lists the surface number #, in order from the object side, the radius of curvature R (in mm) of each surface near the optical axis, the on-axis surface spacing D (in mm), as well as the refractive index $N_e$ (at the e-line of $\lambda$=546.1 nm) and the Abbe number $v_d$ (at the d-line of $\lambda$=587.6 nm) of each lens element for Embodiment 6. Listed in the bottom portion of Table 11 are the values of f, f1, f2, D, h2, and z2 (all in mm), which have been defined with respect to Conditions (1)–(3) and (6)–(8) above, for Embodiment 6. Also listed in the bottom of Table 11 are the distance L (in mm) along the optical axis Z0 from the first lens surface S1 of the first lens element L1 to the image plane Simg for an in-focus image of an object at infinity for Embodiment 6, the distances A and B (both in mm) defined above in relation to the position of the stop St and the vertices of lens surfaces S2 and S3, and the ratio B/A.

TABLE 11

| # | R | D | $N_e$ | $v_d$ |
|---|---|---|---|---|
| 1 | 1.830 | 1.313 | 1.58820 | 30.3 |
| 2 | 0.885 | 0.640 | | |
| 3 | 15.351 | 1.800 | 1.51081 | 56.0 |
| 4 | −1.209 | | | |
| f = 3.492 | f1 = −6.010 | f2 = 2.277 | D = 3.743 | h2 = 0.605 |
| z2 = 0.250 | L = 7.267 | A = 0.400 | B = 0.240 | B/A = 0.600 |

Table 12 below lists the values of the constants K and $A_3$–$A_{10}$ used in Equation (A) above for each of the lens surfaces of Table 11. Aspheric coefficients that are not present in Table 12 are zero. An "E" in the data indicates that the number following the "E" is the exponent to the base 10. For example, "1.0E-2" represents the number $1.0 \times 10^{-2}$. The values recited are those obtained by rounding off the fourth decimal place.

TABLE 10

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −1.8623 | 4.5018E−2 | −3.2800E−2 | 6.4917E−2 | 2.1694E−2 | −3.6540E−2 | −1.9240E−2 | 3.3575E−2 | −9.3497E−3 |
| 2 | 5.0568E−1 | −1.3519E−2 | 9.7673E−2 | 1.6792E−1 | 1.5435E−1 | 2.4024E−2 | −1.6113E−2 | −7.4627E−2 | −7.1457E−3 |
| 3 | 5.3709E−1 | −1.5669E−2 | 1.9077E−2 | −2.7094E−2 | −2.8172E−2 | 1.6645E−1 | 4.6708E−2 | −1.1026E−1 | −3.7819E−2 |
| 4 | −8.1849E−1 | 2.7577E−2 | −1.0761E−1 | −4.0127E−2 | −9.5906E−3 | 1.0324E−1 | 1.3059E−3 | −1.1640E−1 | 5.6422E−2 |

TABLE 12

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −1.6428 | 3.9129E−2 | −2.8360E−2 | 6.9559E−2 | 2.0032E−2 | −4.4209E−2 | −1.8287E−2 | 4.0964E−2 | −1.2700E−2 |
| 2 | 4.8860E−1 | −1.6235E−2 | 9.6419E−2 | 1.5830E−1 | 1.5402E−1 | 2.5003E−2 | −1.5848E−2 | −7.1903E−2 | −6.9291E−3 |
| 3 | 5.3692E−1 | −1.2792E−2 | 1.9965E−2 | −2.9523E−2 | −2.8771E−2 | 1.6410E−1 | 4.6923E−2 | −1.0575E−1 | −3.7356E−2 |
| 4 | −8.4622E−1 | 2.8343E−2 | −1.0730E−1 | −4.0223E−2 | −9.5209E−3 | 1.0368E−1 | 1.3585E−3 | −1.1584E−1 | 5.6025E−2 |

The imaging lens of Embodiment 6 satisfies Conditions (1)–(3) and (5)–(8) as will be set out later in Table 21.

FIGS. 13A–13D show the spherical aberration, astigmatism, distortion, and lateral color, respectively, of the imaging lens according to Embodiment 6. In FIG. 13A, the spherical aberration is shown for the e-line ($\lambda$=546.1 nm), the F-line ($\lambda$=486.1 nm), and the C-line ($\lambda$=656.3 nm). As shown in FIG. 13A, the f-number, denoted as FNO, of this embodiment is 2.8. As shown in FIGS. 13B–13D, the half-field angle $\omega$ of this embodiment is 34.2°. In FIG. 13B, the astigmatism is shown at the e-line ($\lambda$=546.1 nm) for both the sagittal image surface S and the tangential image surface T. In FIG. 13C, the distortion is shown at the e-line ($\lambda$=546.1 nm). FIG. 13D shows the lateral color at the F-line ($\lambda$=486.1 nm), and the C-line ($\lambda$=656.3 nm) relative to the e-line ($\lambda$=546.1 nm). The coma aberrations of this embodiment at half-field angles $\omega$ of 25.4° and 34.2° at the e-line ($\lambda$=546.1 nm) are shown at the top and bottom, respectively, of FIG. 14.

As is clear from the lens data and aberration curves discussed above, in Embodiment 6 the various aberrations are favorably corrected, and performance capabilities that are suitable for an imaging lens are obtained.

Embodiment 7

Figure 15:
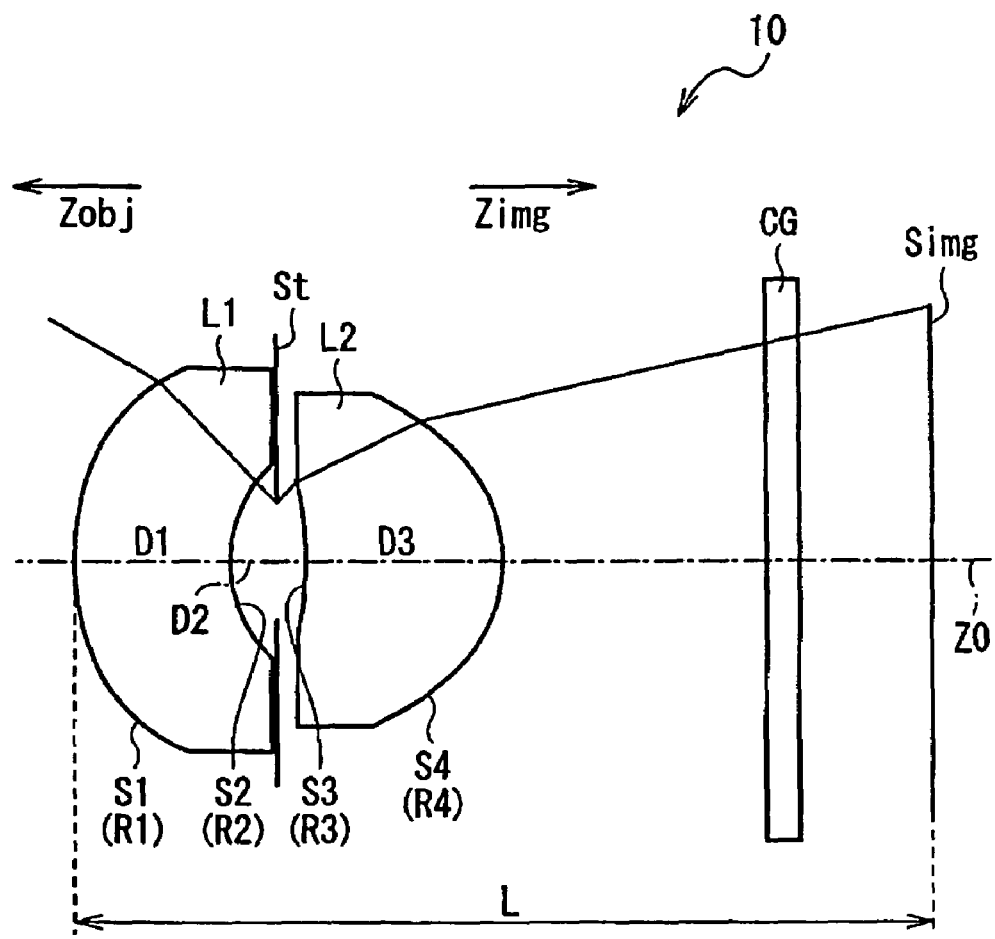
FIG. 15 shows a schematic cross-sectional view of the imaging lens according to Embodiment 7.

FIG. 15 shows a schematic cross-sectional view of the imaging lens of Embodiment 7 of the present invention. All the reference symbols of FIG. 15 are defined as previously defined with regard to FIG. 1 and Embodiment 1. Therefore, those definitions are not repeated here. The lens element configuration of imaging lens 10 of Embodiment 7 is similar to that of imaging lens 1 of Embodiment 1. Therefore, only differences between Embodiment 7 and Embodiment 1 will be explained.

One major difference between Embodiment 7 and Embodiment 1 (as well as Embodiments 2–6) is that in the imaging lens of Embodiment 7, as shown in FIG. 15, the shape of the object-side surface S3 near the optical axis Z0 of lens element L2 is concave, thereby defining a meniscus shape of the second lens element L2. Additionally, lens materials having the same refractive indices and Abbe numbers, which may be the same lens material, are used for both lens elements L1 and L2.

Table 13 below lists the surface number #, in order from the object side, the radius of curvature R (in mm) of each surface near the optical axis, the on-axis surface spacing D (in mm), as well as the refractive index $N_e$ (at the e-line of $\lambda$=546.1 nm) and the Abbe number $v_d$ (at the d-line of $\lambda$=587.6 nm) of each lens element for Embodiment 7. Listed in the bottom portion of Table 13 are the values of f, f1, f2, D, h2, and z2 (all in mm), which have been defined with respect to Conditions (1)–(3) and (6)–(8) above, for Embodiment 7. Also listed in the bottom of Table 13 are the distance L (in mm) along the optical axis Z0 from the first lens surface S1 of the first lens element L1 to the image plane Simg for an in-focus image of an object at infinity for Embodiment 7, the distances A and B (both in mm) defined above in relation to the position of the stop St and the vertices of lens surfaces S2 and S3, and the ratio B/A.

TABLE 13

| # | R | D | $N_e$ | $v_d$ |
|---|---|---|---|---|
| 1 | 2.963 | 1.303 | 1.51081 | 56.0 |
| 2 | 1.772 | 0.640 | | |
| 3 | −5.772 | 1.800 | 1.51081 | 56.0 |
| 4 | −1.264 | | | |
| f = 3.522 | f1 = −13.637 | f2 = 2.789 | D = 3.743 | h2 = 0.689 |
| z2 = 0.198 | L = 7.548 | A = 0.400 | B = 0.240 | B/A = 0.600 |

Table 14 below lists the values of the constants K and $A_3$–$A_{10}$ used in Equation (A) above for each of the lens surfaces of Table 13. Aspheric coefficients that are not present in Table 14 are zero. An "E" in the data indicates that the number following the "E" is the exponent to the base 10. For example, "1.0E-2" represents the number $1.0 \times 10^{-2}$. The values recited are those obtained by rounding off the fourth decimal place.

TABLE 14

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −2.6975 | −1.2903E−2 | 5.4551E−3 | 8.9950E−2 | 2.2003E−2 | −9.2140E−2 | −2.6381E−2 | 8.6464E−2 | −2.9474E−2 |
| 2 | −2.5477 | 7.1546E−2 | 4.9232E−2 | 1.6470E−1 | 1.6786E−1 | 7.2101E−2 | −2.1522E−2 | −1.7903E−1 | −1.8190E−2 |
| 3 | 4.9051E−1 | 2.4192E−2 | 4.3368E−2 | −1.7516E−1 | −3.8254E−2 | 1.7462E−1 | 5.6349E−2 | 9.0302E−2 | −4.5034E−3 |
| 4 | −7.9911E−1 | −1.4205E−3 | −1.1747E−1 | 3.6261E−2 | −1.6848E−2 | 5.1346E−2 | 6.1040E−3 | −9.1029E−2 | 4.6436E−2 |

The imaging lens of Embodiment 7 satisfies Conditions (1)–(4), (7) and (8) as will be set out later in Table 21.

Figures 16A, 16B, 16C, 16D:
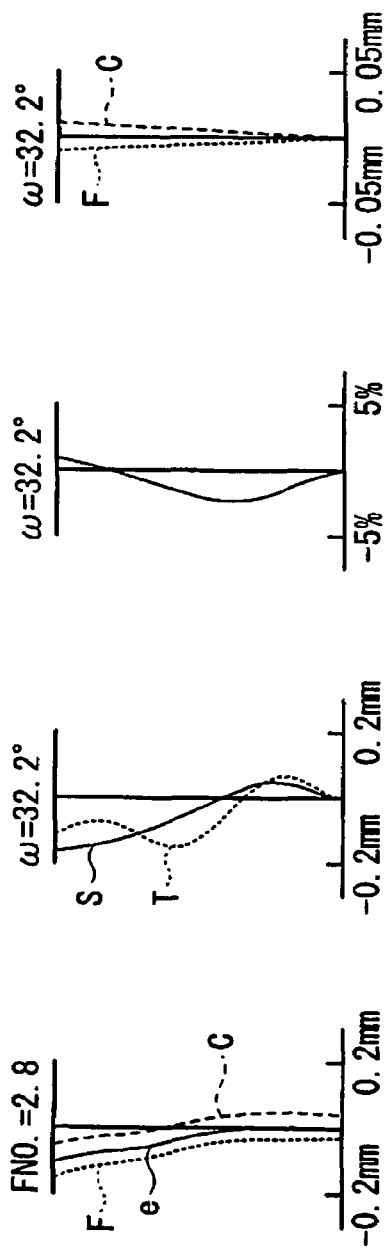
FIGS. 16A–16D show the spherical aberration, astigmatism, distortion, and lateral color, respectively, of the imaging lens according to Embodiment 7.
Figure 17:
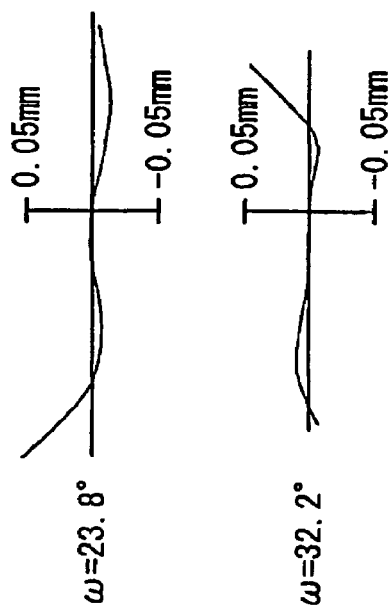
FIG. 17 shows coma aberrations of the imaging lens according to Embodiment 7.

FIGS. 16A–16D show the spherical aberration, astigmatism, distortion, and lateral color, respectively, of the imaging lens according to Embodiment 7. In FIG. 16A, the spherical aberration is shown for the e-line ($\lambda$=546.1 nm), the F-line ($\lambda$=486.1 nm), and the C-line ($\lambda$=656.3 nm). As shown in FIG. 16A, the f-number, denoted as FNO, of this embodiment is 2.8. As shown in FIGS. 16B–16D, the half-field angle $\omega$ of this embodiment is 32.2°. In FIG. 16B, the astigmatism is shown at the e-line ($\lambda$=546.1 nm) for both the sagittal image surface S and the tangential image surface T. In FIG. 16C, the distortion is shown at the e-line ($\lambda$=546.1 nm). FIG. 16D shows the lateral color at the F-line ($\lambda$=486.1 nm), and the C-line (λ=656.3 nm) relative to the e-line (λ=546.1 nm). The coma aberrations of this embodiment at half-field angles ω of 23.8° and 32.2° at the e-line (λ=546.1 nm) are shown at the top and bottom, respectively, of FIG. 17.

As is clear from the lens data and aberration curves discussed above, in Embodiment 7 the various aberrations are favorably corrected, and performance capabilities that are suitable for an imaging lens are obtained.

Embodiment 8

Embodiment 8 is similar to Embodiment 1, shown in FIG. 1, in that the shape of the object-side surface S3 near the optical axis Z0 is convex. Therefore, Embodiment 8 is well shown by FIG. 1. However, as in Embodiment 7, shown in FIG. 15, in Embodiment 8, lens materials having the same refractive indices and Abbe numbers, which may be the same lens material, are used for both lens elements L1 and L2.

Table 15 below lists the surface number #, in order from the object side, the radius of curvature R (in mm) of each surface near the optical axis, the on-axis surface spacing D (in mm), as well as the refractive index $N_e$ (at the e-line of λ=546.1 nm) and the Abbe number $v_d$ (at the d-line of λ=587.6 nm) of each lens element for Embodiment 8. Listed in the bottom portion of Table 15 are the values of f1, f2, D, h2, and z2 (in mm), which have been defined with respect to Conditions (1)–(3) and (6)–(8) above, for Embodiment 8. Also listed in the bottom of Table 15 are the distance L (in mm) along the optical axis Z0 from the first lens surface S1 of the first lens element L1 to the image plane Simg for an in-focus image of an object at infinity for Embodiment 8, the distances A and B (in mm) defined above in relation to the position of the stop St and the vertices of lens surfaces S2 and S3, and the ratio B/A.

TABLE 15

| # | R | D | $N_e$ | $v_d$ |
|---|---|---|---|---|
| 1 | 1.755 | 1.252 | 1.51081 | 56.0 |
| 2 | 0.765 | 0.720 | | |
| 3 | 14.255 | 1.569 | 1.51081 | 56.0 |
| 4 | −1.204 | | | |
| f = 3.502 | f1 = −4.641 | f2 = 2.252 | D = 3.547 | h2 = 0.634 |
| z2 = 0.332 | L = 7.407 | A = 0.480 | B = 0.240 | B/A = 0.500 |

Table 16 below lists the values of the constants K and $A_3$–$A_{10}$ used in Equation (A) above for each of the lens surfaces of Table 15. Aspheric coefficients that are not present in Table 16 are zero. An "E" in the data indicates that the number following the "E" is the exponent to the base 10. For example, "1.0E-2" represents the number $1.0 \times 10^{-2}$. The values recited are those obtained by rounding off the fourth decimal place.

Figures 18A, 18B, 18C, 18D:
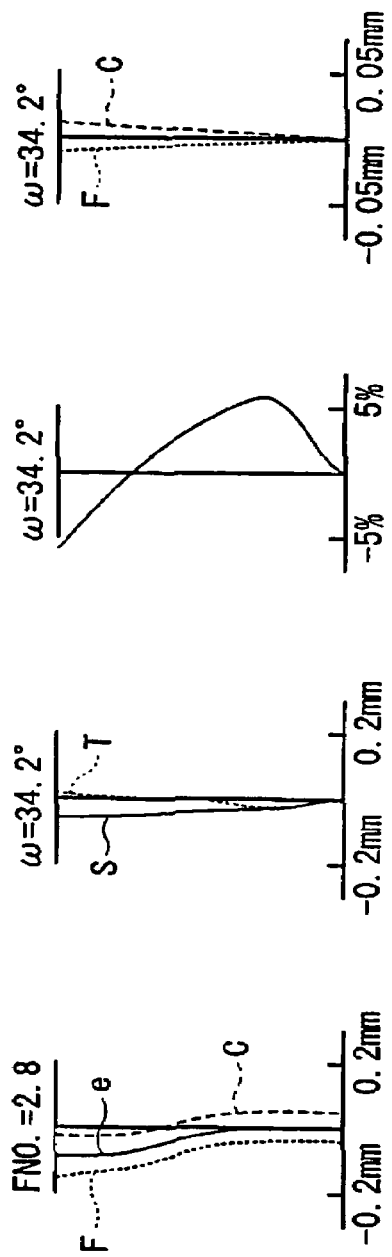
FIGS. 18A–18D show the spherical aberration, astigmatism, distortion, and lateral color, respectively, of the imaging lens according to Embodiment 8.
Figure 19:
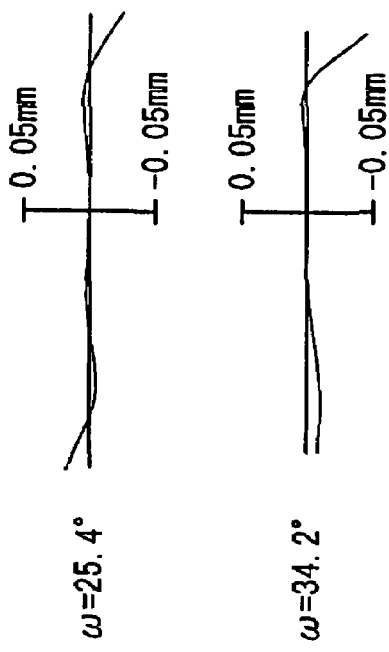
FIG. 19 shows coma aberrations of the imaging lens according to Embodiment 8.

FIGS. 18A–18D show the spherical aberration, astigmatism, distortion, and lateral color, respectively, of the imaging lens according to Embodiment 8. In FIG. 18A, the spherical aberration is shown for the e-line (λ=546.1 nm), the F-line (λ=486.1 nm), and the C-line (λ=656.3 nm). As shown in FIG. 18A, the f-number, denoted as FNO, of this embodiment is 2.8. As shown in FIGS. 18B–18D, the half-field angle ω of this embodiment is 34.2°. In FIG. 18B, the astigmatism is shown at the e-line (λ=546.1 nm) for both the sagittal image surface S and the tangential image surface T. In FIG. 18C, the distortion is shown at the e-line (λ=546.1 nm). FIG. 18D shows the lateral color at the F-line (λ=486.1 nm), and the C-line (λ=656.3 nm) relative to the e-line (λ=546.1 nm). The coma aberrations of this embodiment at half-field angles ω of 25.4° and 34.2° at the e-line (λ=546.1 nm) are shown at the top and bottom, respectively, of FIG. 19.

As is clear from the lens data and aberration curves discussed above, in Embodiment 8 the various aberrations are favorably corrected, and performance capabilities that are suitable for an imaging lens are obtained.

Embodiment 9

Embodiment 9 is very similar to Embodiment 7 and is well shown by FIG. 15. Table 17 below lists the surface number #, in order from the object side, the radius of curvature R (in mm) of each surface near the optical axis, the on-axis surface spacing D (in mm), as well as the refractive index $N_e$ (at the e-line of λ=546.1 nm) and the Abbe number $v_d$ (at the d-line of λ=587.6 nm) of each lens element for Embodiment 9. Listed in the bottom portion of Table 17 are the values of f, f1, f2, D, h2, and z2 (all in mm), which have been defined with respect to Conditions (1)–(3) and (6)–(8) above, for Embodiment 9. Also listed in the bottom of Table 17 are the distance L (in mm) along the optical axis Z0 from the first lens surface S1 of the first lens element L1 to the image plane Simg for an in-focus image of an object at infinity for Embodiment 9, the distances A and B (both in mm) defined above in relation to the position of the stop St and the vertices of lens surfaces S2 and S3, and the ratio B/A.

TABLE 17

| # | R | D | $N_e$ | $v_d$ |
|---|---|---|---|---|
| 1 | 3.146 | 1.385 | 1.51081 | 56.0 |
| 2 | 1.724 | 0.640 | | |
| 3 | −5.403 | 1.500 | 1.51081 | 56.0 |
| 4 | −1.209 | | | |
| f = 3.548 | f1 = −11.162 | f2 = 2.721 | D = 3.516 | h2 = 0.687 |
| z2 = 0.214 | L = 7.369 | A = 0.400 | B = 0.240 | B/A = 0.600 |

Table 18 below lists the values of the constants K and $A_3$–$A_{10}$ used in Equation (A) above for each of the lens

TABLE 16

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −1.6697 | 7.7091E−2 | −4.4670E−2 | 4.0361E−2 | 3.0812E−2 | −2.1599E−2 | −2.5960E−2 | 3.6207E−2 | −1.1850E−2 |
| 2 | 8.1277E−2 | 2.2646E−3 | 8.4954E−2 | 2.9418E−1 | 1.7764E−1 | 2.3714E−1 | −7.5347E−4 | 2.3446E−2 | −1.3245E−3 |
| 3 | 5.4071E−1 | −3.2058E−2 | 4.0273E−2 | 5.6469E−3 | −3.2772E−2 | 1.2351E−1 | 4.5740E−2 | −7.9573E−2 | −3.0961E−2 |
| 4 | 3.2001E−1 | 6.6189E−2 | −1.0887E−1 | 2.2345E−2 | −5.9145E−3 | 7.9221E−2 | −5.4006E−3 | −1.3107E−1 | 7.8518E−2 |

The imaging lens of Embodiment 8 satisfies Conditions (1)–(4) and (6)–(8) as will be set out later in Table 21.

surfaces of Table 17. Aspheric coefficients that are not present in Table 18 are zero. An "E" in the data indicates that the number following the "E" is the exponent to the base 10. For example, "1.0E-2" represents the number $1.0 \times 10^{-2}$. The values recited are those obtained by rounding off the fourth decimal place.

Listed in the bottom portion of Table 19 are the values of f, f1, f2, D, h2, and z2 (all in mm), which have been defined with respect to Conditions (1)–(3) and (6)–(8) above, for Embodiment 10. Also listed in the bottom of Table 19 are the

TABLE 18

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −2.1032E−2 | −1.2793E−3 | 2.1796E−2 | 2.5773E−2 | 6.2507E−3 | −2.7119E−2 | −1.0144E−2 | 2.9043E−2 | −9.1086E−3 |
| 2 | −2.2717 | 7.9259E−2 | 5.6408E−2 | 8.6200E−2 | 1.6915E−1 | 2.2810E−1 | 1.4460E−3 | 5.1383E−2 | 1.0557E−3 |
| 3 | 5.3780E−1 | −6.5331E−3 | 4.7434E−2 | −6.0297E−2 | −4.4922E−2 | 7.1587E−2 | 5.1626E−2 | 6.2409E−2 | −1.3387E−2 |
| 4 | −2.4596E−1 | 1.2813E−2 | −1.0474E−1 | 2.9269E−2 | −7.9075E−3 | 4.7515E−2 | −4.1230E−3 | −1.0374E−1 | 6.0866E−2 |

The imaging lens of Embodiment 9 satisfies Conditions (1)–(4), (7), and (8) as will be set out later in Table 21.

FIGS. 20A–20D show the spherical aberration, astigmatism, distortion, and lateral color, respectively, of the imaging lens according to Embodiment 9. In FIG. 20A, the spherical aberration is shown for the e-line ($\lambda$=546.1 nm), the F-line ($\lambda$=486.1 nm), and the C-line ($\lambda$=656.3 nm). As shown in FIG. 20A, the f-number, denoted as FNO, of this embodiment is 2.8. As shown in FIGS. 20B–20D, the half-field angle $\omega$ of this embodiment is 31.6°. In FIG. 20B, the astigmatism is shown at the e-line ($\lambda$=546.1 nm) for both the sagittal image surface S and the tangential image surface T. In FIG. 20C, the distortion is shown at the e-line ($\lambda$=546.1 nm). FIG. 20D shows the lateral color at the F-line ($\lambda$=486.1 nm), and the C-line ($\lambda$=656.3 nm) relative to the e-line ($\lambda$=546.1 nm). The coma aberrations of this embodiment at half-field angles $\omega$ of 23.3° and 31.6° at the e-line ($\lambda$=546.1 nm) are shown at the top and bottom, respectively, of FIG. 21.

As is clear from the lens data and aberration curves discussed above, in Embodiment 9 the various aberrations are favorably corrected, and performance capabilities that are suitable for an imaging lens are obtained.

Embodiment 10

Embodiment 10 is very similar to Embodiment 8. That is, Embodiment 10 is similar to Embodiment 1, shown in FIG. 1, in that the shape of the object-side surface S3 near the optical axis Z0 is convex. Therefore, Embodiment 10 is well shown by FIG. 1. However, as in Embodiment 7, shown in FIG. 15, in Embodiment 10, lens materials having the same refractive indices and Abbe numbers, which may be the same lens material, are used for both lens elements L1 and L2.

Table 19 below lists the surface number #, in order from the object side, the radius of curvature R (in mm) of each surface near the optical axis, the on-axis surface spacing D (in mm), as well as the refractive index $N_e$ (at the e-line of $\lambda$=546.1 nm) and the Abbe number $\nu_d$ (at the d-line of $\lambda$=587.6 nm) of each lens element for Embodiment 10.

distance L (in mm) along the optical axis Z0 from the first lens surface S1 of the first lens element L1 to the image plane Simg for an in-focus image of an object at infinity for Embodiment 10, the distances A and B (both in mm) defined above in relation to the position of the stop St and the vertices of lens surfaces S2 and S3, and the ratio B/A.

TABLE 19

| # | R | D | $N_e$ | $\nu_d$ |
|---|---|---|---|---|
| 1 | 1.677 | 1.400 | 1.51081 | 56.0 |
| 2 | 0.849 | 0.740 | | |
| 3 | 6.736 | 2.500 | 1.51081 | 56.0 |
| 4 | −1.320 | | | |

| f = 3.440 | f1 = −7.848 | f2 = 2.415 | D = 4.654 | h2 = 0.650 |
| z2 = 0.272 | L = 7.805 | A = 0.500 | B = 0.240 | B/A = 0.480 |

Table 20 below lists the values of the constants K and $A_3$–$A_{10}$ used in Equation (A) above for each of the lens surfaces of Table 19. Aspheric coefficients that are not present in Table 20 are zero. An "E" in the data indicates that the number following the "E" is the exponent to the base 10. For example, "1.0E-2" represents the number $1.0 \times 10^{-2}$. The values recited are those obtained by rounding off the fourth decimal place.

TABLE 20

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 3.1024E−1 | 0.0000 | 1.2252E−2 | 0.0000 | 6.5989E−3 | 0.0000 | −8.5156E−4 | 0.0000 | 0.0000 |
| 2 | 4.2165E−1 | 0.0000 | 4.3969E−2 | 0.0000 | −3.1032E−2 | 0.0000 | 1.2315E−2 | 0.0000 | 0.0000 |
| 3 | 8.9457E−1 | −3.3934E−2 | 1.1795E−2 | 8.9719E−2 | −4.4529E−2 | −5.0655E−2 | 4.0216E−2 | 1.3023E−2 | −1.2253E−2 |
| 4 | −2.8135 | −4.0823E−2 | −6.8014E−2 | −3.1499E−2 | −9.0281E−3 | 6.2662E−2 | 2.0031E−3 | −4.4122E−2 | 1.7012E−2 |

The imaging lens of Embodiment 10 satisfies Conditions (1)–(4) and (6)–(8) as will be set out later in Table 21.

FIGS. 22A–22D show the spherical aberration, astigmatism, distortion, and lateral color, respectively, of the imaging lens according to Embodiment 10. In FIG. 22A, the spherical aberration is shown for the e-line ($\lambda$=546.1 nm), the F-line ($\lambda$=486.1 nm), and the C-line ($\lambda$=656.3 nm). As shown in FIG. 22A, the f-number, denoted as FNO, of this embodiment is 2.8. As shown in FIGS. 22B–22D, the half-field angle $\omega$ of this embodiment is 35.4°. In FIG. 22B, the astigmatism is shown at the e-line ($\lambda$=546.1 nm) for both the sagittal image surface S and the tangential image surface T. In FIG. 22C, the distortion is shown at the e-line (λ=546.1 nm). FIG. 22D shows the lateral color at the F-line (λ=486.1 nm), and the C-line (λ=656.3 nm) relative to the e-line (λ=546.1 nm). The coma aberrations of this embodiment at half-field angles ω of 26.4° and 35.4° at the e-line (λ=546.1 nm) are shown at the top and bottom, respectively, of FIG. 23.

As is clear from the lens data and aberration curves discussed above, in Embodiment 10 the various aberrations are favorably corrected, and performance capabilities that are suitable for an imaging lens are obtained.

Embodiments (1)–(10) variously satisfy Conditions (1)–(3) and (6)–(8) above and one of either mutually exclusive Conditions (4) and (5), except Embodiments (7) and (9) that do not satisfy Condition (6), as summarized in Table 21 below.

TABLE 21

| | Condition: | | | | | | |
|---|---|---|---|---|---|---|---|
| | (1) $D2/D$ | (2) $h2/z2$ | (3) $f/R3$ | (4), (5) $v_{d1}, v_{d2}$ | (6) $f/R3$ | (7) $f2/f$ | (8) $f2^2/|f \cdot f1|$ |
| Upper limit | 0.21 | 3.6 | 0.7 | | 0.6 | 0.8 | 0.32 |
| Lower limit | 0.15 | 0 | 0 | | 0 | 0.6 | 0.15 |
| Embodiment | | | | | | | |
| 1 | 0.168 | 2.398 | 0.000 | < | 0.000 | 0.654 | 0.228 |
| 2 | 0.168 | 2.465 | 0.159 | < | 0.159 | 0.647 | 0.221 |
| 3 | 0.165 | 2.498 | 0.227 | < | 0.227 | 0.646 | 0.224 |
| 4 | 0.164 | 2.471 | 0.173 | < | 0.173 | 0.641 | 0.192 |
| 5 | 0.166 | 2.414 | 0.235 | < | 0.235 | 0.642 | 0.237 |
| 6 | 0.171 | 2.423 | 0.227 | < | 0.227 | 0.652 | 0.247 |
| 7 | 0.171 | 3.470 | −0.610 | = | −0.610 | 0.792 | 0.162 |
| 8 | 0.203 | 1.907 | 0.246 | = | 0.246 | 0.643 | 0.312 |
| 9 | 0.182 | 3.212 | −0.657 | = | −0.657 | 0.767 | 0.187 |
| 10 | 0.159 | 2.387 | 0.511 | = | 0.511 | 0.702 | 0.216 |

For comparison purposes, Table 22 below summarizes the values related to Conditions (1)–(8) for the examples of imaging lenses disclosed in Japanese Laid-Open Patent Applications H06-067089 (Examples 1 and 2), H11-295592 (Examples 3–7), and H13-183578 (Examples and 9).

TABLE 22

| | Condition: | | | | | | |
|---|---|---|---|---|---|---|---|
| | (1) $D2/D$ | (2) $h2/z2$ | (3) $f/R3$ | (4), (5) $v_{d1}, v_{d2}$ | (6) $f/R3$ | (7) $f2/f$ | (8) $f2^2/|f \cdot f1|$ |
| Upper limit | 0.21 | 3.6 | 0.7 | | 0.6 | 0.8 | 0.32 |
| Lower limit | 0.15 | 0 | 0 | | 0 | 0.6 | 0.15 |
| Example | | | | | | | |
| 1 | 0.156 | 5.855 | 0.655 | = | 0.655 | 0.742 | 0.067 |
| 2 | 0.484 | 3.996 | 0.714 | = | 0.714 | 0.861 | 0.240 |
| 3 | 0.333 | 2.191 | 1.146 | < | 1.146 | 1.076 | 1.055 |
| 4 | 0.299 | 2.293 | 1.307 | < | 1.307 | 1.007 | 0.924 |
| 5 | 0.333 | 2.062 | 1.000 | < | 1.000 | 1.136 | 1.015 |
| 6 | 0.351 | 2.004 | 1.125 | < | 1.125 | 1.063 | 0.846 |
| 7 | 0.402 | 2.035 | 0.973 | < | 0.973 | 1.088 | 0.758 |
| 8 | 0.298 | 1.795 | −0.051 | < | −0.051 | 0.767 | 0.354 |
| 9 | 0.432 | 1.894 | −0.083 | = | −0.083 | 0.826 | 0.424 |

As can be seen from Table 22, none of the examples satisfy both Conditions (1) and (2) above, and none of the examples satisfy more than four of the six Conditions (1)–(3) and (6)–(8).

Table 23 below lists the ratios L/f, with L and f defined as set forth above, for Embodiments (1)–(10) and Examples (1)–(9) discussed above.

TABLE 23

| Embodiment | L/f | Example | L/f |
|---|---|---|---|
| 1 | 2.072 | 1 | 1.789 |
| 2 | 2.034 | 2 | 2.133 |
| 3 | 2.074 | 3 | 4.125 |
| 4 | 2.021 | 4 | 4.180 |
| 5 | 2.089 | 5 | 4.543 |
| 6 | 2.080 | 6 | 3.793 |
| 7 | 2.143 | 7 | 3.882 |
| 8 | 2.115 | 8 | 2.441 |
| 9 | 2.077 | 9 | 2.441 |
| 10 | 2.269 | | |

As shown in Table 23, the values of L/f for Embodiments (1)–(10) are in the range of 2.02 to 2.27, which enables the imaging lenses to be compact and an image at the image plane Simg to be fully detected by a small image pickup element. In contrast, the values of L/f for Examples (1)–(9) are in the range of 2.4 to 4.6, with the exceptions of Examples 1 and 2, and thus, in general, the examples do not provide the compactness of Embodiments (1)–(10).

As is evident from the lens data and the aberration figures discussed above, the imaging lens of the present invention favorably corrects aberrations, provides a bright image having an f-number of four or smaller, provides a half-field angle of 25 degrees or more, and is able to also provide the compactness associated with having the ratio of L/f in the range of 2.02 to 2.27.

The invention being thus described, it will be obvious that the same may be varied in many ways. For instance, values such as the radius of curvature R of each of the lens elements, the surface spacing D, the refractive index $N_e$, as well as the Abbe number $v_d$, are not limited to the examples indicated in each of the aforementioned embodiments, as other values can be adopted. Also, lens elements that act as lens components may variously be modified to be lens components that include more than one lens element. Additionally, only the shape of the refracting surfaces of the lens elements L1 and L2 are prescribed as described above. Other surfaces of the lens elements L1 and L2 may take many different shapes from those shown in FIG. 2. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens formed of only two lens components, arranged along an optical axis in order from the object side, as follows:

a first lens component;

a stop; and a second lens component;

wherein the two object-side lens surfaces and the two image-side lens surfaces of the two lens components are aspheric;

the first lens component has negative refractive power, the lens surface on the object side of the first lens component is convex near the optical axis, and the lens surface on the image side of the first lens component is concave near the optical axis;

the second lens component has positive refractive power and the lens surface on the image side of the second lens component is convex near the optical axis; and the following conditions are satisfied:

$$0.15 < D2/D < 0.21$$

$$h2/z2 < 3.6$$

where

D is the distance along the optical axis from the object-side lens surface of the first lens component to the image-side lens surface of the second lens component, D2 is the distance along the optical axis from the image-side lens surface of the first lens component to the object-side lens surface of the second lens component;

h2 is the distance from the optical axis to the outermost optically effective portion of the second lens surface of the first lens component, and z2 is the distance along the optical axis from the vertex of the second lens surface of the first lens component to the point on the optical axis where h2 is determined.

2. The imaging lens of claim 1, wherein each of the first lens component and the second lens component consists of a lens element.

3. The imaging lens of claim 1, wherein the following condition is satisfied:

$$0 \leq |f/R| \leq 0.7$$

where f is the focal length of the entire imaging lens, and

R is the radius of curvature on the optical axis of the object-side lens surface of the second lens component.

4. The imaging lens of claim 2, wherein the following condition is satisfied:

$$b\ 0 \leq |f/R| \leq 0.7$$

where f is the focal length of the entire imaging lens, and

R is radius of curvature on the optical axis of the object-side lens surface of the second lens component.

5. The imaging lens of claim 2, wherein the following condition is satisfied:

$$\nu_{d1} = \nu_{d2}$$

where $\nu_{d1}$ is the Abbe number at the d-line ($\lambda$=587.6 nm) of the lens material of the lens element that forms the first lens component, and $\nu_2$ is the Abbe number at the d-line ($\lambda$=587.6 nm) of the lens material of the lens element that forms the second lens component.

6. The imaging lens of claim 2, wherein the following condition is satisfied:

$$\nu_{d1} < \nu_{d2}$$

where $\nu_{d1}$ is the Abbe number at the d-line ($\lambda$=587.6 nm) of the lens material of the lens element that forms the first lens component, and $\nu_{d2}$ is the Abbe number at the d-line ($\lambda$=587.6 nm) of the lens material of the lens element that forms the second lens component.

7. The imaging lens of claim 6, wherein the following condition is satisfied:

$$0 \leq |f/R| \leq 0.6$$

where f is the focal length of the entire imaging lens, and

R is the radius of curvature on the optical axis of the object-side lens surface of the second lens component.

8. The imaging lens of claim 3, wherein the following conditions are satisfied:

$$0.6 \leq f2/f \leq 0.8$$

$$0.15 \leq (f2)^2/|f \cdot f1| \leq 0.32$$

where f1 is the focal length of the first lens component, and f2 is the focal length of the second lens component.

9. The imaging lens of claim 4, wherein the following conditions are satisfied:

$$0.6 \leq f2/f \leq 0.8$$

$$0.15 \leq (f2)^2/|f \cdot f1| \leq 0.32$$

where f1 is the focal length of the first lens component, and f2 is the focal length of the second lens component.

10. The imaging lens of claim 7, wherein the following conditions are satisfied:

$$0.6 \leq f2/f \leq 0.8$$

$$0.15 \leq (f2)^2/|f \cdot f1| \leq 0.32$$

where f1 is the focal length of the first lens component, and f2 is the focal length of the second lens component.

* * * * *